United States Patent

Martens et al.

[11] Patent Number: 6,046,773
[45] Date of Patent: Apr. 4, 2000

[54] APPARATUS AND METHOD FOR DECODING VIDEO IMAGES

[75] Inventors: Harald Aagaard Martens; Jan Otto Reberg, both of München, Germany

[73] Assignee: IDT International Digital Technologies Deutschland GmbH, Ismaning, Germany

[21] Appl. No.: 08/750,363
[22] PCT Filed: Jun. 2, 1995
[86] PCT No.: PCT/EP95/02105
    § 371 Date: Dec. 2, 1996
    § 102(e) Date: Dec. 2, 1996
[87] PCT Pub. No.: WO95/34172
    PCT Pub. Date: Dec. 14, 1995

[30] Foreign Application Priority Data

Jun. 3, 1994 [NO] Norway ........................ 942080

[51] Int. Cl.[7] .............................. H04N 7/30; H04N 7/32
[52] U.S. Cl. ...................... 348/384; 348/390; 382/233; 382/234
[58] Field of Search .................. 348/384, 390, 348/403, 407, 413, 416, 699; 386/109; 382/233, 234, 239, 243, 244, 248; H04N 7/30, 7/32

[56] References Cited

U.S. PATENT DOCUMENTS 5,067,019  11/1991  Juday et al. ........................ 348/580
5,363,475  11/1994  Baker et al. ........................ 395/122

(List continued on next page.)

FOREIGN PATENT DOCUMENTS 0107981  5/1984  European Pat. Off. .......... A63F 9/22
0162503  11/1985  European Pat. Off. ....... H04N 5/262

(List continued on next page.)

OTHER PUBLICATIONS

Yuichiro Nakaya and Hiroshi Harashima, An Iterative Motion Estimation Method Using Triangular Patches For Motion Compensation, Nov. 11, 1991, pp. 546–557/SPIE vol. 1605, Visual Communications and Image Processing '91.

Norbert Diehl, Object–Oriented Motion Estimation and Segmentation in Image Sequences, vol. 3, No. 1, Signal Processing: Image Communications, Feb. 1991, pp. 23–56.

S. Hartwig, W. Endemann, Digitale Bildcodierung, FKT Fernseh–und Kino–Technik, Jan. 1993, pp. 33–42.

Y. Nakaya and H. Harashima, Motion Compensation at Very Low Rates, PCS'93 1993 Picture Coding Symposium Proceedings, Swiss Federal Institute of Technology, Lausanne, Switzerland, Mar. 17, 1993, pp. 10.2/a–b.

Chung–Lin Huang and Chao–Yuen Hsu, A New Motion Compensation Method For Image Sequence Coding Using Hierarchical Grid Interpolation, IEEE Transactions on Circuits and Systems for Video Technology, Feb. 4, 1994, vol. 4, No. 1.

Primary Examiner—Bryan Tung
Assistant Examiner—Vu Le
Attorney, Agent, or Firm—Darby & Darby

[57] ABSTRACT

The invention discloses an apparatus for decoding a video sequence, compressed according to a known data modeling method suitable for transmission or storage, into decompressed frames, suitable for viewing, the data model comprising a plurality of spatial intensity changes patterns, called intensity loads, a plurality of spatial address change patterns, called address loads, and a plurality of values, called scores, specifying for each frame how much of each load should be present. Each of the loads includes respective hardware components for storing and processing it. The respective components are connected in a pipeline consisting of parallel synchronous data paths, through which pipeline the intermediate image and motion field are continuously transmitted.

12 Claims, 30 Drawing Sheets

U.S. PATENT DOCUMENTS

| | | | |
|---|---|---|---|
| 5,479,603 | 12/1995 | Stone et al. | 395/161 |
| 5,497,498 | 3/1996 | Taylor | 395/800 |
| 5,759,044 | 6/1998 | Redmond | 348/383 |
| 5,765,011 | 6/1998 | Wilkinson et al. | 395/800.2 |

FOREIGN PATENT DOCUMENTS

| | | | |
|---|---|---|---|
| 0177997 | 4/1986 | European Pat. Off. | H04N 5/262 |
| 0280316 | 8/1988 | European Pat. Off. | G06F 15/62 |
| 0339867 | 11/1989 | European Pat. Off. | G06F 15/70 |
| 0469842 | 2/1992 | European Pat. Off. | H04N 5/782 |
| 0506429 | 9/1992 | European Pat. Off. | G06F 15/62 |
| 0562672 | 9/1993 | European Pat. Off. | H04N 7/13 |
| 0572046 | 12/1993 | European Pat. Off. | H04N 7/137 |
| 0572766 | 12/1993 | European Pat. Off. | G06F 15/66 |
| 0584840 | 3/1994 | European Pat. Off. | H04N 7/13 |
| 0442548 | 8/1991 | France | H03M 7/40 |
| 0547696 | 6/1993 | France | H04N 1/40 |
| 4138517 | 5/1993 | Germany | H04N 7/26 |
| 2245797 | 1/1992 | United Kingdom | H04N 7/13 |
| WO 9203799 | 3/1992 | WIPO | G06F 15/66 |
| WO 95/08240 | 3/1995 | WIPO | H04N 5/917 |
| WO 95/34172 | 12/1995 | WIPO | H04N 7/26 |

FIG. 5a h

|   |   |   |   |   |   |   |   |   |   |   |   |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 1 | 1 | 0 | 0 | 0 | 0 | 0 | 0 |   |
| 0 | 0 | 1 | 1 | 1 | 1 | 0 | 0 | 0 | 0 | 0 |   |
| 0 | 1 | 1 | 1 | 1 | 1 | 0 | 0 | 2 | 2 | 2 |   |
| 0 | 1 | 1 | 1 | 1 | 1 | 0 | 0 | 2 | 2 |   |   |
| 0 | 0 | 1 | 1 | 1 | 1 | 1 | 0 | 0 | 2 |   |   |
| 0 | 0 | 0 | 1 | 1 | 1 | 0 | 0 |   |   |   |   |
| 0 | 0 | 0 | 0 | 0 | 0 | 0 |   |   |   |   |   |
| 0 | 0 | 0 | 0 |   |   |   |   |   |   |   |   |

500 points to the grid. v is the vertical axis label.

FIG. 5b

| | Holon | v | h | nRefEls |
|---|---|---|---|---|
| 0 | | | | |
| 1 | | | | ~524 |
| 2 | | | | |
| Run • | | | | |
| • | | | | |
| • | | | | |
| nRuns-1 | | | | |

520 labels the table. Columns: 530, 532, 534, 536.

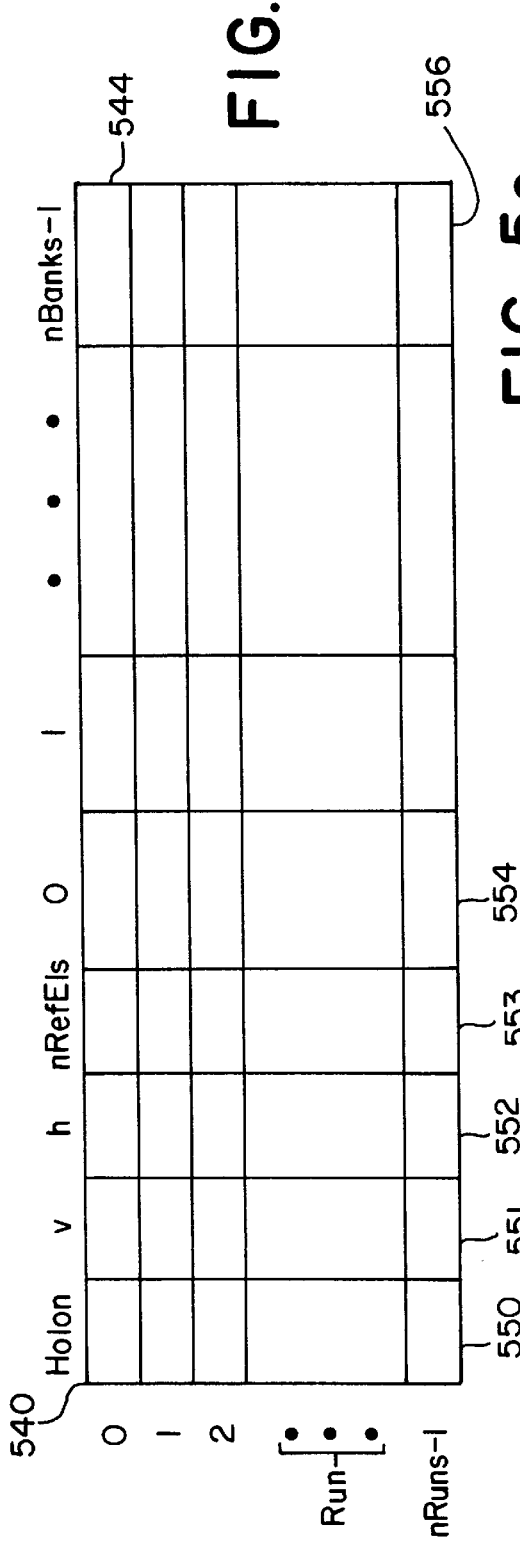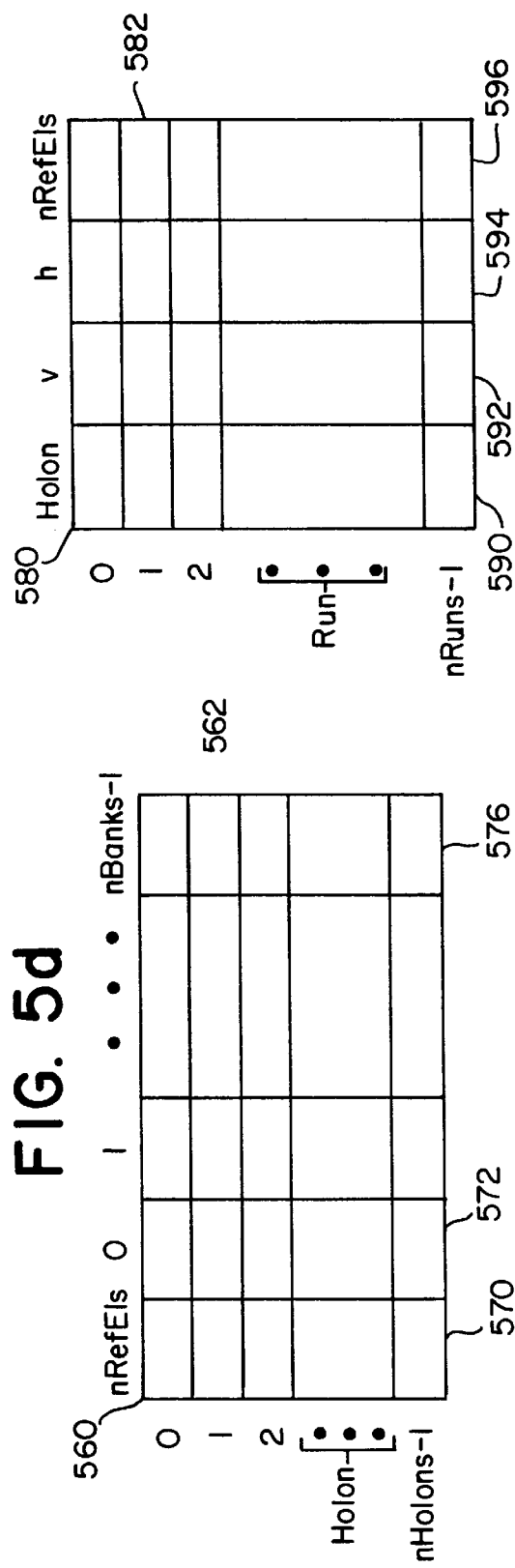

Reference position image

Move

APPARATUS AND METHOD FOR DECODING VIDEO IMAGES

DESCRIPTION

1. Field of the Invention

The invention relates to an apparatus and method for decoding video images, especially for decoding a video sequence, compressed according to a known data modelling method suitable for transmission or storage, into decompressed frames, suitable for viewing, said encoded data model comprising a plurality of spatial intensity change patterns, called intensity loads, a plurality of spatial address change patterns, called address loads, and a plurality of values, called scores, specifying for each frame how much of each load should be present. The invention further relates to a method for transforming a source image, consisting of picture elements given in integer positions in a first two-dimensional coordinate system, into a target image consisting of picture elements given in integer positions in a second two-dimensional coordinate system.

2. Background of the Invention

The use of digital techniques for transmission and storage of images is becoming more and more widespread. However, the high number of bits required to represent digital images in raw form is often a problem, demanding high transmission band width or large amounts of storage media. This is the motivation for using compression techniques, which aim at reducing the number of bits required to represent the images without impairing image quality too much.

Early methods of digital image transmission and storage used Pulse Code Modulation (PCM). More recent systems use digital compression techniques. One such compression technique is JPEG, where each frame is compressed as a still image, independent of the other frames. The frame is digitized into picture elements, called pixels, and the pixels are grouped together into blocks of 8×8 pixels. Each block is transformed using DCT (Discrete Cosine Transform). The transform coefficients are quantized and run length coded, and the result is then coded with a Variable Length Code like Huffman code or Arithmetic Coding. The resulting bit stream is then transmitted or stored.

In a TV signal, subsequent frames are often related to each other, in that the same objects can be seen in several frames, possibly at differing positions in the frame corresponding to object or camera motion. This gives rise to the family of motion compensated compression techniques. One such technique is MPEG. In MPEG, some frames are compressed using still image coding similar to JPEG. Other frames are coded by prediction and motion compensation: For each block, the encoder performs a search for the most similar block in a small search region around the current block position but in a previously transmitted frame. Only the position of the found best match relative to the current block position, called the motion vector for the block, need to be transferred, together with a DCT coded residual. The decoder can then reconstruct the frame by collecting pixels according to the motion vector, perform an inverse DCT on the coded residual and can then add the results together.

Research is being done on model based compression techniques, like wire frames or object-based region coding, but a commercial breakthrough has not come yet.

One possible application for digital compression and decompression techniques is the storage of video films on CD-ROMs. Without compression, less than one minute of a digitized video film can be put on a single disk. In order to store a full video film on a disk, compression techniques must be used. The resulting data must then be decompressed before or when it is viewed.

Another possible application is Video On Demand, implemented so that many users are connected to one common distribution central. Each user has the possibility to choose one from a large number of films for immediate playback, and the distribution central must then transmit the wanted film to this user. A highest possible number of users is wanted, and they should be interconnected using a least possible expensive cable network. The distribution central therefore often uses compression techniques, creating the need to decompress the data for viewing.

Yet another possible group of applications is simulators, games and Virtual Reality. Such systems produce images that are partly based on already available images, and partly on interactive user input. A set of rules decide how user input should affect the images to be displayed.

In patent application WO95/08240, which is hereby included by reference, a method and apparatus for data analysis is presented. The system, called IDLE, encompasses an encoder suited for encoding, amongst other data sets, video sequences, and a decoder suited for decoding the same data sets.

It is an object of the present invention to provide a hardware architecture that implements a full IDLE image decoder capable of running in real time.

It is a further object of this invention to provide an image decoding method which allows real-time decoding of video images.

It is a further object of this invention to provide an architecture that can be used for a range of wanted image sizes and complexities. Therefore the invention is presented without dimensioning for one particular TV system etc, but rather with descriptions on how to adapt to various formats.

It is a further object of this invention to provide optimizations for lowering the manufacturing cost of an IDLE compliant decoder.

It is a still further object of this invention to provide a decoder that is robust with regard to transmission errors.

Further it is an object of this invention to provide a decoder that can be used for interactive simulations and games.

SUMMARY OF THE INVENTION

According to the IDLE modelling principle, the content of the sequence is broken into scenes. In each scene, each object, called holon, is modelled separately using spatial intensity change patterns, called blush loads, spatial address change patterns, called smile loads, and corresponding values called smile and blush scores that specifies for each frame how much of each load should be used to reconstruct the holon. The holons are in the end placed together in a finished frame, suitable for viewing etc.

The invention in its first preferred embodiment is a simple decoder consisting of modules for receiving a compressed IDLE model, decompressing it into its intermediate format, storing it for the time it is relevant, and then reconstructing the frames of the sequence from the model. The modules forward results between each other using a pipeline.

In a second preferred embodiment, a more optimized decoder is presented, including mechanisms for enhancing the modelling capabilities, optimizing memory usage, and optimizing computational speed.

The apparatus is suited for implementation using VLSI electronics.

The advantage of the invention comes mainly from the efficient use of many simple dedicated processing elements operating synchronously with each other. Data are forwarded between processing elements in a simple pipeline. There is little need for random access into large memory banks; most accesses are sequential. The system is designed so that most of the processing elements can perform the numerical operations with low precision (4, 8, 12 or 16 bit), yet the quality of the produced images is very good. Most operations are simple additions, multiplications and shifts. Some division modules are needed, but they can be computed with so low precision that a look-up table can be used.

Based on on these principles, a hardware implementation of this decoder can be configured to provide a processing speed of 100–10000 times that of a Personal Computer running an equivalent software program, yet the cost in mass production may be lower. Frame sizes at least up to PAL or NTSC format, and models with high complexity, can be handled using currently available VLSI technology. Since this invention is compliant to the system described in WO 95/08240 mentioned above, the advantages mentioned there also apply. These include good compression ratios, good image quality, and good interpretability and control potential of the models.

The invention further discloses a method of transforming a source image, consisting of picture elements given in integer positions in a first two-dimensional coordinate system, into a target image consisting of picture elements given in integer positions in a second two-dimensional coordinate system.

An image decoder and image decoding method is disclosed which allows real-time decoding of video sequences compressed according to the IDLE modelling method. The compressed model may contain both multi-factor intensity as well as multi-factor motion representations of the images. The model may optionally be altered during the decoding, giving possibility for interactive TV and TV-quality games.

BRIEF DESCRIPTION OF THE DRAWINGS

FIG. 5a shows the basic format of the S field;

FIG. 5b shows a run-length coded format of the S field;

FIG. 5c shows another run-length coded format of the S field, with individual load bank adressing;

FIGS. 5d and e together show yet another run-length coded format of the S field;

DETAILED DESCRIPTION OF THE PREFERRED EMBODIMENTS

First Preferred Embodiment

Figure 1:
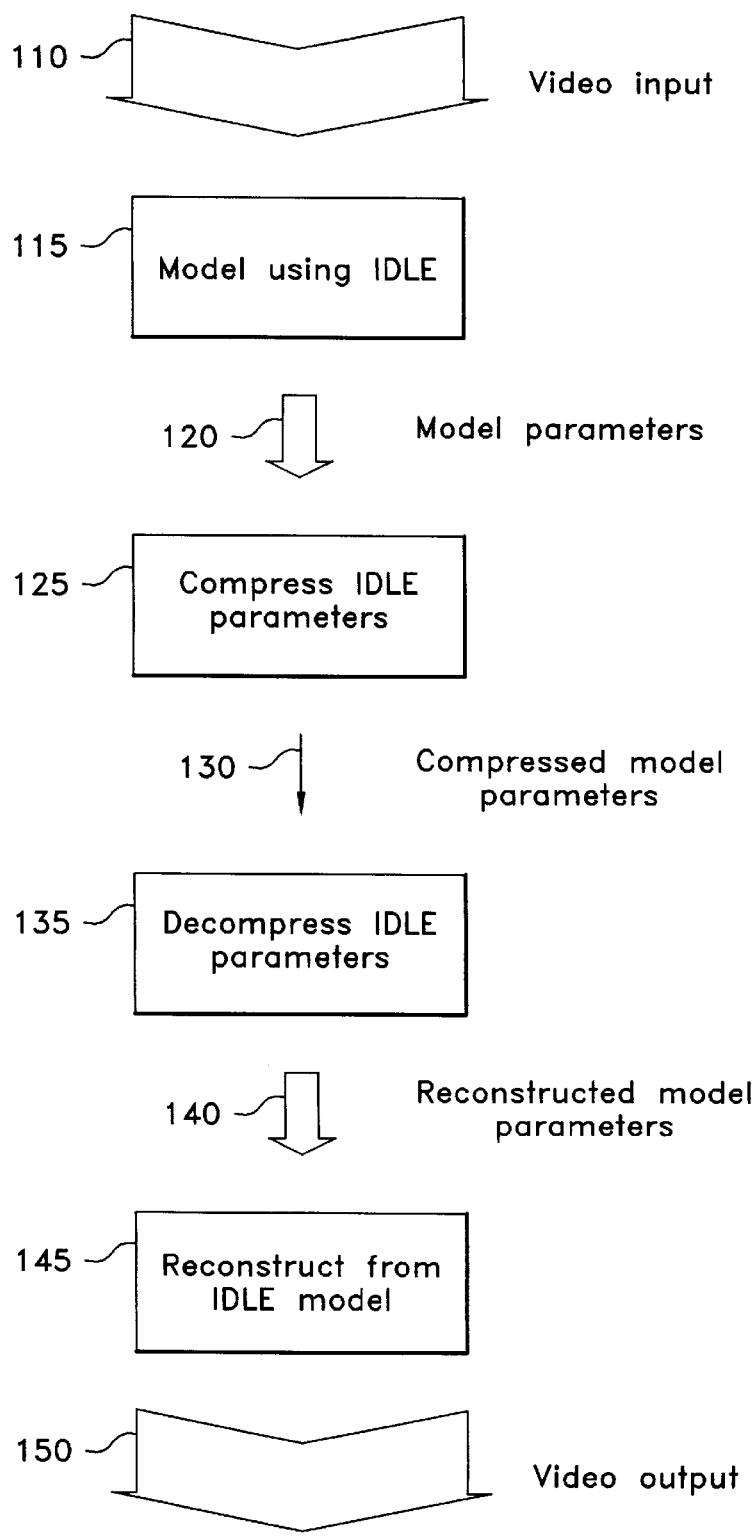
FIG. 1 gives an overview of a transmission system based on the IDLE modelling principle with an encoder and a decoder.

FIG. 1 gives an overview of an IDLE based transmission or storage system according to WO95/08240. A sequence of digitized video frames 110 is fed into an IDLE modeller 115. The resulting model 120 is further compressed using traditional techniques like run-length coding, variable length coding, Discrete Cosine Transform DCT or similar, as it is shown in block 125. The resulting bit stream 130 has a much lower number of bits than the original representation 110, and so is more suited for distribution e.g. by broadcasting, or storage e.g. on magnetic tapes or optical disks.

Before the distributed or stored compressed bit stream 130 can be viewed, it must be decoded. This is done in two steps: First the IDLE model is decompressed, shown in block 135, and the decompressed IDLE model parameters 145 are then used to reconstruct (block 145) each individual frame 150. This invention is concerned with this decoding from compressed bit stream 130 to viewable frames 150.

Figure 2:
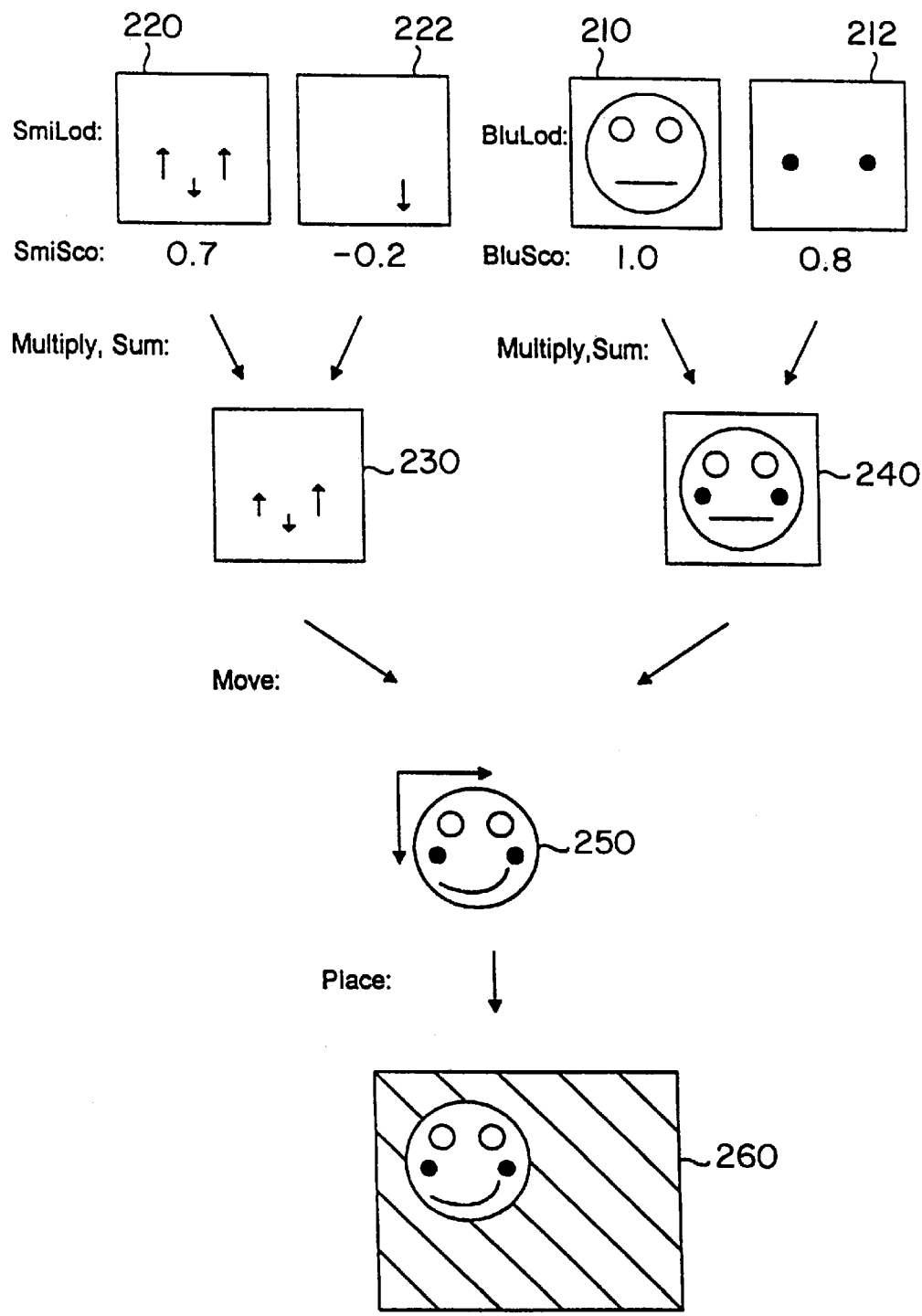
FIG. 2 gives an general overview of the steps involved in decoding.

Patent application WO95/08240 presents the general modelling method. The basic method for reconstructing a frame from an IDLE model is shown in FIG. 2 using an example: An original video sequence consisted of a face with a mouth moving in various ways, representing smile, and changing intensity of its cheeks, representing blush. The face and the background are modelled as separate objects, also called holons. A "typical" face, which could be from one of the frames of the sequence, is stored as one blush load 210. Its tendency to blush is represented as a further blush load 212. Each blush load has an associated score. The collection of a load and a score is called a factor. The blushed image 240 is formed by first for each factor multiplying together the score with the load for each pixel, and then adding the result pixelwise.

The example shows a monochrome blush model, but the principle may be used for color images. One preferred embodiment is to represent each blush load in monochrome and let each blush load affect one color channel, e.g. Red, Green or Blue, so that when the corresponding score is adjusted, only one color channel of the image is changed. This is called separable blush. Another preferred embodiment is to represent each blush load in full color and correspondingly let it affect all color channels, so that changing the score affects all color channels. This is called non-separable blush. Modelling using separable blush often has the advantage of allowing more variation using a constant number of loads, or alternatively using a lower number of loads to represent the same variation, which leads to savings in necessary memory capacity. Modelling using non-separable blush often has the advantage of resulting in models which corresponds better to a physical reality, so that when the blush in the input is caused by one phenomenon manifesting itself in two or more color channels, it is still represented as only one factor and the amount of its presence can be controlled by just one score.

Correspondingly, two of the main patterns of moving the mouth are stored as two smile loads 220, 222. A smile field 230 is found by adding together contributions from smile factors, each smile factor consisting of a product of score and load.

The example shows vertical motions only, but the same principle may be applied to combinations of vertical and horizontal motions. One preferred embodiment is to let each smile load affect only one dimension, either vertical or horizontal, so that changing one score leads to only vertical or only horizontal motion. This is called separable smile modelling. Another preferred embodiment is to let each smile load have one vertical and one horizontal component, and thereby let one score affect a motion in both a vertical and a horizontal direction. This is called non-separable smile modelling. The respective advantages of separable and non-separable smile modelling are similar to those for blush modelling.

The blushed image is then moved according to the smile field. How to move, also called warp or displace, an image according to a smile field, often called motion field, warp field or disparity field, is described in "Digital Image Warping", third edition, G. Wolberg, IEEE Computer Society Press, 1994, which is hereby included by reference. The result 250 is then placed into the frame 260. The whole process is repeated for the other holons, in this case the background. The frame is now ready and can be presented to the viewer. Scores, and possibily also loads, are then updated, and the processing can continue for the next frame.

Figure 3:
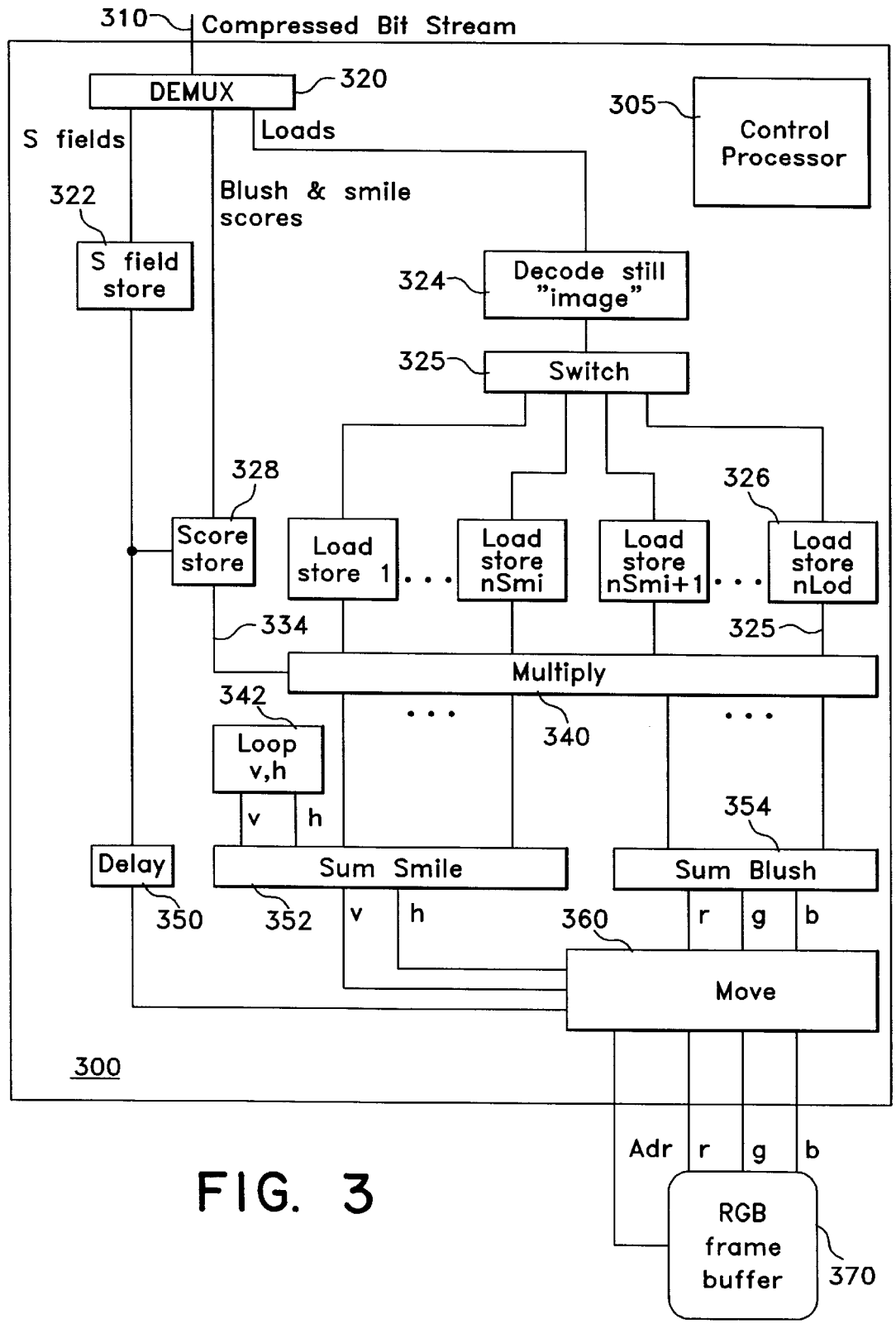
FIG. 3 shows the IDLE decoder in its basic version.

FIG. 3 shows an overview over a first preferred embodiment. A decoder 300 contains a control processor 305. The connections between the control processor and other processing elements are not shown for reasons of simplicity, but its main purpose is to synchronize the various elements with the speed of the incoming bit stream, the speed of other processing elements, and the frame rate, and it does so by starting, pausing and stopping the processing elements. Because the control processor does not have to process individual pixels, it has a relatively small computational load. It can therefore be implemented either as a dedicated processor or as a general purpose microprocessor, such as e.g. Intel 386 SX.

A compressed bit stream 310 contains all model information needed to decode frames. The individual parts of data are labelled according to a communication protocol so that a demultiplexing unit 320, DEMUX for short, can redirect the data to correct processing elements.

The compressed bit stream 310 can have been produced by an automatic encoder. It can also, especially for applications within the field of simulations and games, have been produced more or less manually by a human operator.

The loads have characteristics of a traditional still image, that is, they are functions over a 2-dimensional grid of vertical and horizontal coordinates, and they have a high degree of spatial redundancy. It is therefore efficient to store or transmit the loads according to known image compression techniques, e.g. DCT as described in "The JPEG Handbook", W. Pennebaker & J. Mitchell, Van Nostrand Reinhold, 1993, which is hereby included by reference, or wavelets, or predictive coding. Accordingly, on the decoder side the compressed loads must be sent through a still image decoder 324 where it is decoded into its full representation.

Each factor is intended to be applicable to several frames, so the decoder must have an ability to store the corresponding load for the time needed to decode these frames. For this, the decoder 300 has a number of load stores 326. A switch 325 controls to which load store the result from the still image decoder 324 is sent. This switch is controlled by the control processor 305. One preferred embodiment is to send the load to the first free load store for the correct domain. Another preferred embodiment is to let the compressed bit stream 310 contain side information that decides in which load store the load is stored.

Each load store can store data for several different holons. Which part of the load stores contain data for which holon is administrated by the segment field, or S field for short, stored in the S field store 322. This is a structure that maps each element of each load store to one holon. One preferred embodiment is illustrated in FIG. 5a, where the S field store 322 of FIG. 3 is shown with an example and in more detail. All load stores have the same size and the various loads for each holon occupy the same places in each load store. The S field store 500 also has the same size, and in each element in S is stored the number of the holon the corresponding elements in the load stores are assigned to. The example shows a first holon, indicated by ones, and a second holon, indicated by twos, surrounded by unused space, indicated by zeroes.

Each element of the S field has associated with it a vertical coordinate v and a horizontal coordinate h, and each load for this holon may also have an element corresponding to this position. The axis are chosen so that v=0, h=0 is the upper left corner, with v indicating scan lines in increasing direction downwards and h indicating elements on the scan line in increasing direction rightwards. The collection of such position is called the reference coordinate system, containing objects in reference position.

Each reference position element, consisting of all the blush load values, smile load values and other values that might be specific for the element, will in short be called RefEl (cp. FIG. 5b).

Further processing will take place based on a pipeline, consisting of a data path with several pipeline channels and of several processing elements applying various operations to the data arriving on the pipeline. The pipeline will be synchronized using a pipeline clock. Each pipeline clock pulse corresponds to one new RefEl entering the pipeline, and, equivalently, one operation being applied to each of the other RefEls already in the pipeline.

The data from all load stores 326 and the S field store 322 is read in parallel into the start of the pipeline 330, 334. One preferred embodiment is to read out all RefEls in steady speed and in scan order from the load stores.

Figure 6:
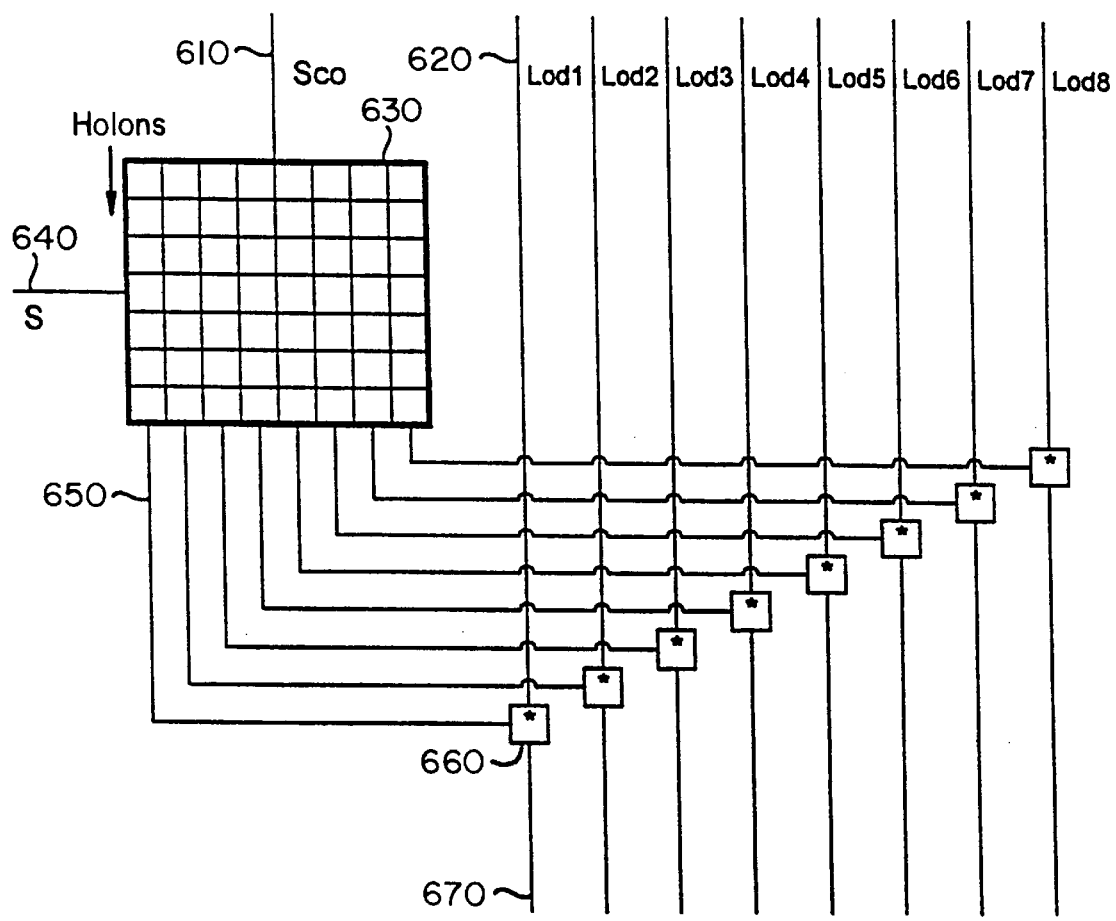
FIG. 6 shows one possible version of the score store, together with the Multiply circuit.

The next step in this pipeline is a multiply unit 340, where scores are multiplied together with loads. A score store 328 and the multiply unit 340 are shown together in more detail in FIG. 6. Updates for scores 610 may be downloaded into a score store 630 for each frame. The score store 630 is organized in rows and columns, with each row corresponding to a holon number and each column corresponding to a factor. Then groups of elements 620 from the load banks start to arrive, coordinated with corresponding S values. For each group of elements, the S value 640 selects a row in the score store, and the corresponding scores 650 of each column are sent to multipliers 660, where the score is multiplied together with the load element for all factors. The result is output in parallel on a next segment of a pipeline 670.

For each group of load elements, their address in the final image shall now be found as the sum of its current position and the contributions from the smile factors.

One preferred embodiment is to let the coordinates of the current position be generated by a looping mechanism 342 that is initialized to zeroes for each frame and increments the vertical and horizontal current coordinate v and h for each group of load elements. Another preferred embodiment is to let the addressing logic associated with the load stores 326 generate the current coordinates.

The new position for the group of load elements is now found by adding the current coordinates and the contributions from the smile factors by a sum smile module 352. It may be implemented as one three structured adder adding together all the contributions in the vertical direction and similarily one for the horizontal direction.

Simultaneously, the contributions from the various blush factors are added together in a sum blush module 354. For the case of a color system, it may be implemented as one tree structured adder for each of the color channels.

Each pixel of the blushed image is now fed together with its corresponding new position into a move module 360. The S field value 330, delayed in a delay module 350 to compensate for the latency in the multiply, sum smile and sum blush modules, is also fed to the move module 360.

The move module 360 produces pixel values, e.g. r,g,b, and their addresses. The internal organization of the move module will be disclosed further down.

Since the pixels are generated in the reference position scan order and they may move to other addresses in the final frame, they in general do not appear in scan order out from the move module 360. Since most displays and other output equipment are scan order oriented, the pixel must therefore be intermediately stored in a frame buffer 370 before they can be output by video circuitry.

Because of motion, pixels from several holons may overlap. One preferred embodiment is to let the first pixel that appears in a frame buffer element position win in the case of conflicts, and arrange the encoded bit stream such that the frontmost holons are decoded first. This is called first-win. Another preferred embodiment is to let the last pixel that appears win, and arrange the encoded bit stream such that the frontmost holons are decoded last. This is called last-win.

Second Preferred Embodiment

In the first preferred embodiment a minimal IDLE compliant decoder was disclosed. Now, in a second preferred embodiment a more complete IDLE compliant decoder will be disclosed. It will be able to handle larger image sizes with more complex content both with regard to modelling operators and number of factors, with relatively little increase in memory and chip area.

Figure 4A:
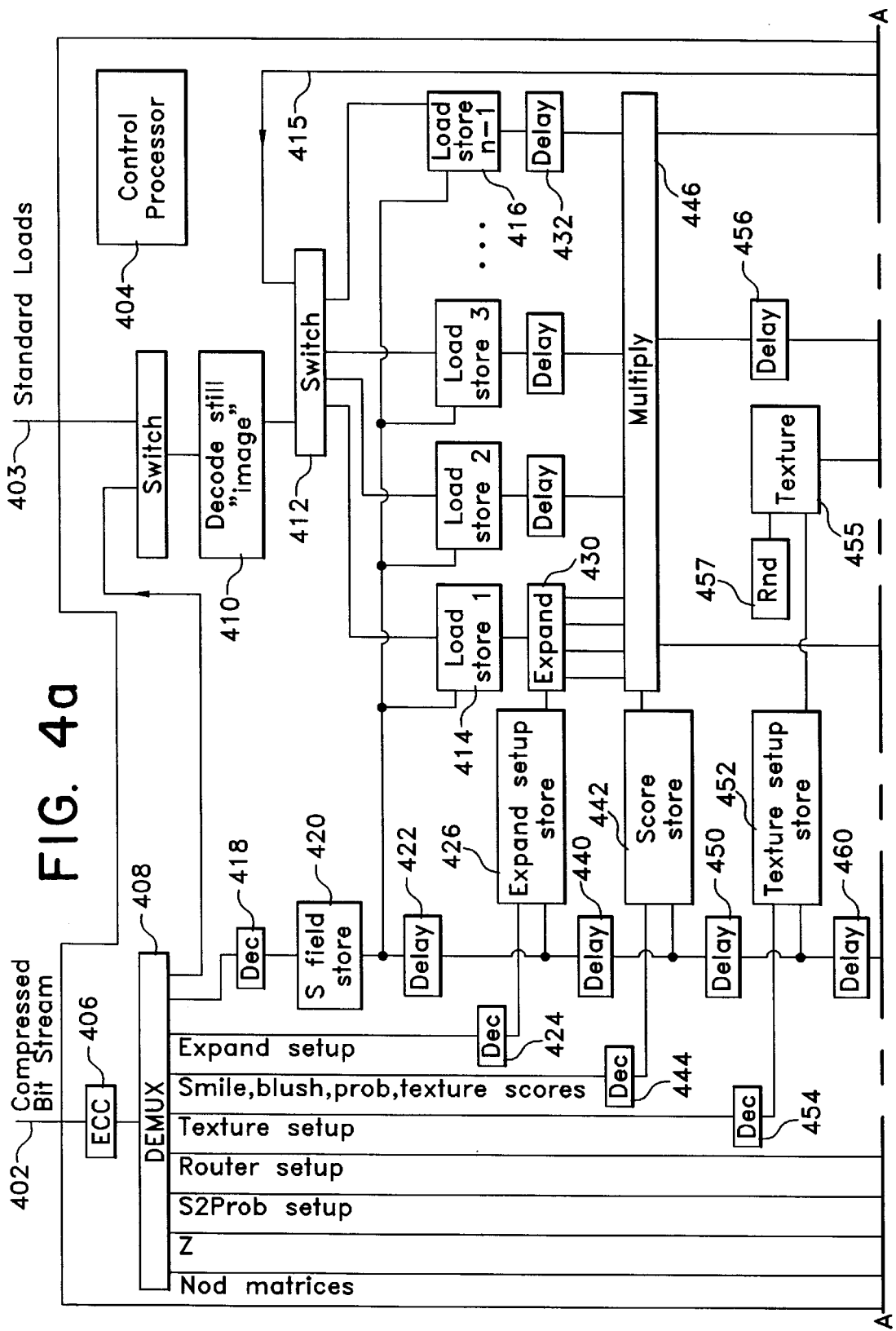
FIGS. 4a, 4b and 4c, which when joined together at match lines A—A and B—B collectively make up FIG. 4 show the IDLE decoder with some options.
Figure 4B:
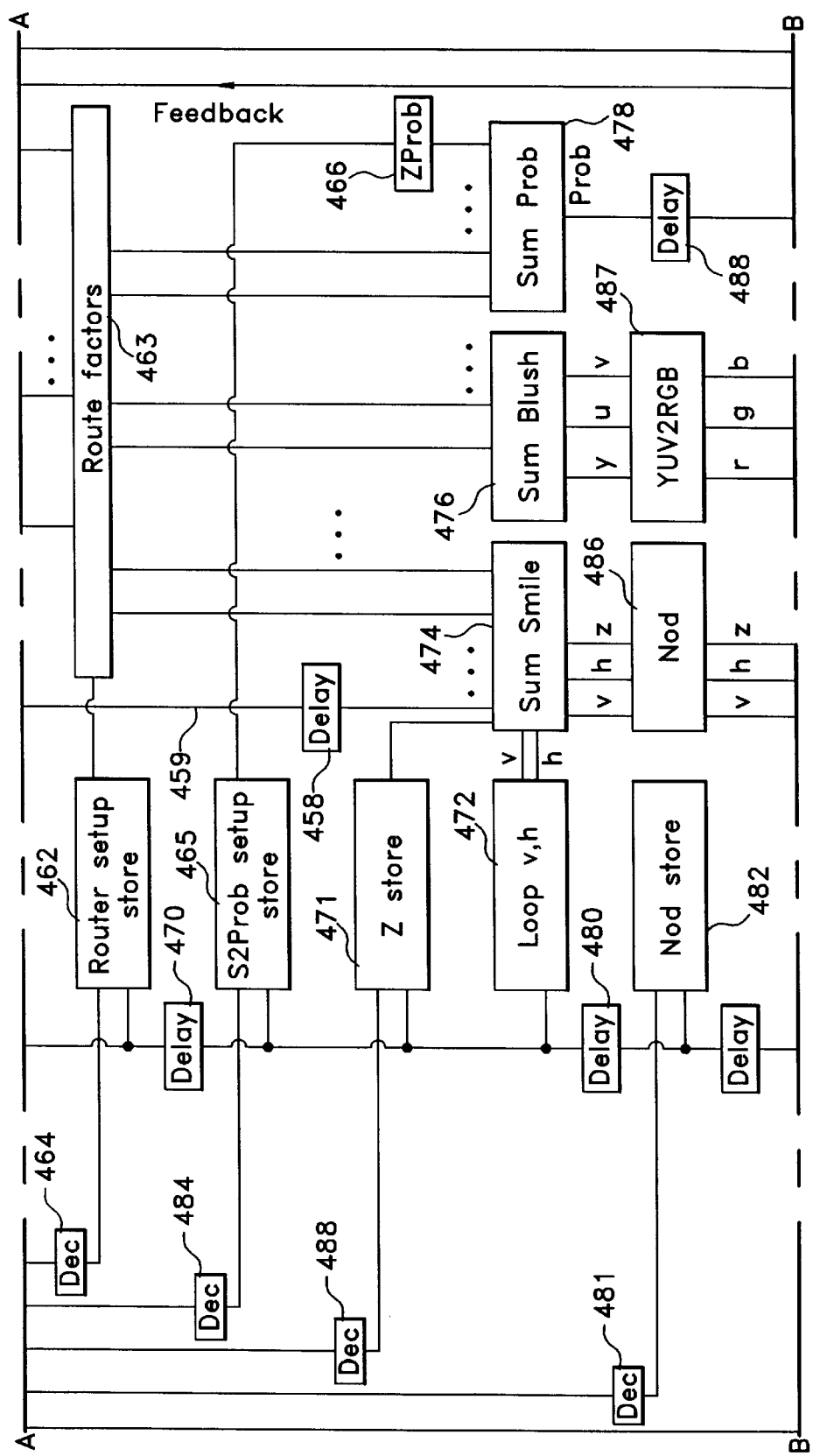
Figure 4C:
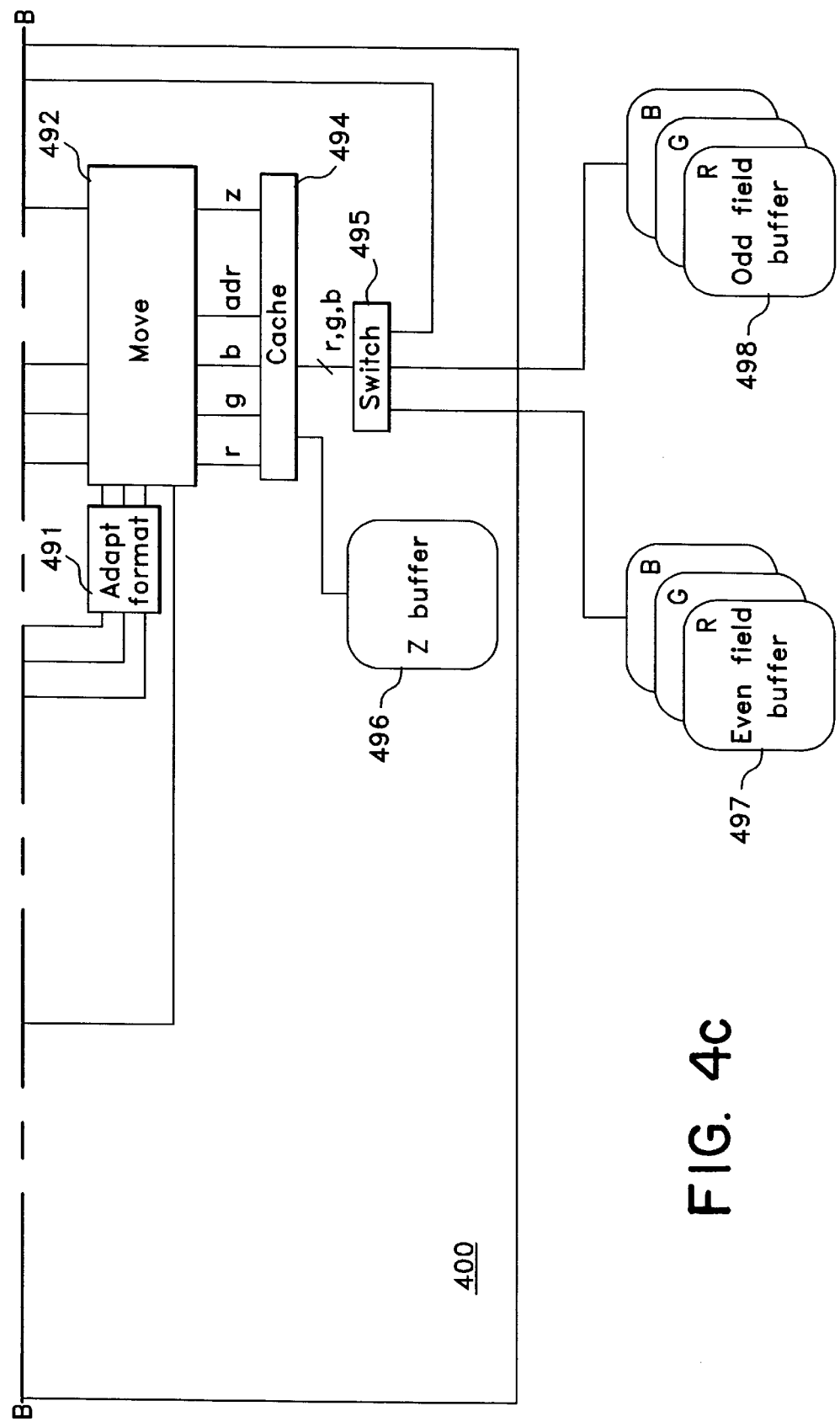

FIG. 4 gives an overview of the second preferred embodiment.

A compressed bit stream 402 is first fed to an error control and correction module 406, ECC for short. This module may both detect and correct transmission errors employing methods like Reed-Solomon codes known from prior art, or just detect errors using methods like cyclic redundancy check, CRC for short. "Digital Communications", J. Proakis, McGraw Hill, 1989, hereby included by reference, shows how to implement Reed-Solomon codes. In applications where a two-way transmission is available, it would also be possible to request a retransmission of the erroneous data.

Detected but uncorrected errors in the incoming bitstream may initiate an error concealment strategy. Which strategy should be chosen depends on which data is destroyed. If a small part of a blush or smile load has errors, that part can be set to the average of nearby elements, thereby making the transmission error result in missing features rather than some other pattern. If a major part of a blush or smile load has errors, then the corresponding score can be forced to zero, thus removing the effect of the factor completely. If a score has an error for one or more frames, then the value of the score can be replaced by the value from the previous frames, or it can be replaced by interpolated values based both on preceeding and later scores.

A DEMUX 408 works in the same way as the DEMUX 320 in the first preferred embodiment, except that it must have the ability to recognize a wider range of different data types and redirect them correspondingly.

The load stores 414 . . . 416 may be designed so that they can be written to while a frame is being decoded. One way of achieving this is to used Video Random Access Memory, VRAM, for the load stores. VRAM has the advantage of having two ports, one random access port for writing and one serial port for output. To avoid inconsistensies coming from one RefEl being read out from the load store at the same time it is written, the score in the score store 442 for the corresponding holon and factor can be set to zero, thereby disabling contributions from the load being written. Alternatively, the router 463 to be explained later can be set up to not forward the results from the load being written.

Another solution is to use traditional, slightly less expensive single port RAM for the load stores, switched so that at any point of time, each load store can be either written or read.

Each element of the S field has associated with it a vertical coordinate v and a horizontal coordinate h. Each of the loads for the corresponding holon also has an element associated with the same v and h. An S field element, the corresponding load elements and the explicitly or implicitly given v and h coordinates will in short be called RefEl. The coordinate system associated with the holon will be called the reference position. For the S field layout shown in FIG. 5a, all holons were given in the same coordinate system.

The S field has a high degree of redundancy. If one element of the S field is known, there is a high probability that the next S field element will indicate the same holon. Accordingly, the S field can have a compact format as shown in FIG. 5b. Instead of storing one number for each element position in the load stores as in FIG. 5a, a run length coded version 520 of the S field is maintained, as described in "Principles of Interactive Computer Graphics", McGraw Hill International Book Company, second edition, 1981 by William M. Newman and Robert F. Sproull, which is hereby included by reference. One preferred embodiment is to store each run as the holon number, which may be zero for unoccupied parts of the load stores, and the run length. Another preferred embodiment is to run-length code only the non-zero elements of the S field as shown in FIG. 5b, where each run is represented as one row. As the vertical and horizontal position of the pixel in a thought reference position is now not longer given by the address of the run, each row must not only contain holon number 530 and the number of elements in the run 536, but also the intended vertical and horizontal position 532, 534 of the start of the run.

One advantage of including the intended vertical and horizontal position in the S field store, is that this may be used to compensate for fixed position offsets. Assume that two holons had a tendency to alternately occupy the same position in some frames. Since they cannot be stored in the same position in a data structure as shown in FIG. 5a, at least one would have to be stored at other coordinates. If no other mechanism were implemented to modify the position of holons, a separate smile load must then be used to move the holon back to its correct position. The data structure shown in FIG. 5b allows the same effect to be achieved more efficiently by defining one reference coordinate system for each holon.

The former methods demanded that all load stores must have each holon allocated to the same addresses in all load stores. Another preferred embodiment is to allow the holons to have differing addresses in the load stores. A representation of the S field for this purpose is illustrated in FIG. 5c. There is one row 544 for each run of scan order consecutive S field elements belonging to the same holon. For each run, its holon number 550, vertical 551 and horizontal 552 coordinate of its first RefEl, number of RefEls 553 and for each load bank the address of its first element 554 . . . 556 are given.

If it is decided that each holon should occupy consecutive memory locations in each load store, than another representation of the S fields as outlined in FIGS. 5d and e. FIG. 5d shows how each holon is defined: They are listed in a table 560 where the holon number defines the row 562, and for each holon the number of RefEls 570 and for each load store the address 572 . . . 576 of the first element for this holon is given. In addition each run must be specified by a corresponding table as shown in FIG. 5e, the table 580 containing for each run one row 582, and for each run the holon number 590, the vertical 592 and horizontal 594 position of its first element and the number of RefEls 596 for this run.

The first column 590 gives the holon number, the next two 592, 594 the reference position coordinates of the first element of the run, and the next 596 the number of pels in this run. Then the address in each load store is given explicitly. The address ordering in the load store is free as long as the S field store is organized correspondingly; the values stored in the S field store defines the order or decoding.

Each of the run length coded representations of the S fields as given in FIGS. 5b, 5c and FIGS. 5d and e demand slightly different address generating logic for the load stores. However, all these methods are based on address initialization for the first RefEl in a run, and then sequential readout is used to access the rest of the RefEls in the run.

Each of the run length coded representations also allows repetition of loads for several holons by just referring to the same memory area for several holons. This is believed to be useful mainly for applications where there is a well controlled encoding system, e.g. for a games controller, where human operators can decide during encoding that several holons could share loads.

The S field may be compressed. The run length coding of the S field can be a basis for compression, exploiting redundancy in the horizontal direction. Further compression can be achieved by also exploiting redundancy in the vertical direction, e.g. by for each scan line using the previous scan line as a predictor and then only code a corrector. In this case an S field decoder 418 must be present.

Another way to compress the S field is by differential chain coding. First a point on the contour of a holon is identified. Then a neighbouring point on the contour is found, and the direction from the first to this second point is transmitted. Then a next neighbouring point on the contour is found, the difference in the direction is transmitted, and this is repeated until the whole contour has been encoded. Run length coding and variable code length coding can be used on the differences of direction. The contour is then filled with the holon number. This is repeated until the whole S field has been transmitted.

The load stores may be updated. Dependent on in which order the encoder finds its factors, new loads may be transmitted and the S field may be updated in any order.

There is limited memory capacity in the decoder. Therefore there must be a way to remove old contents of load stores when there is a need to make room for new factors. One method is to have reinitialization to empty upon command from the encoder.

Another more advanced method is to allow selective deletion of contents of load stores. The parts to delete can have be chosen by a priority mechanism in the encoder, and this priority mechanism may assign low priority to holons that are no longer visible, or loads that are of little relevance. Processes in other systems based on similar ideas are therefore often called garbage collection.

Figure 9:
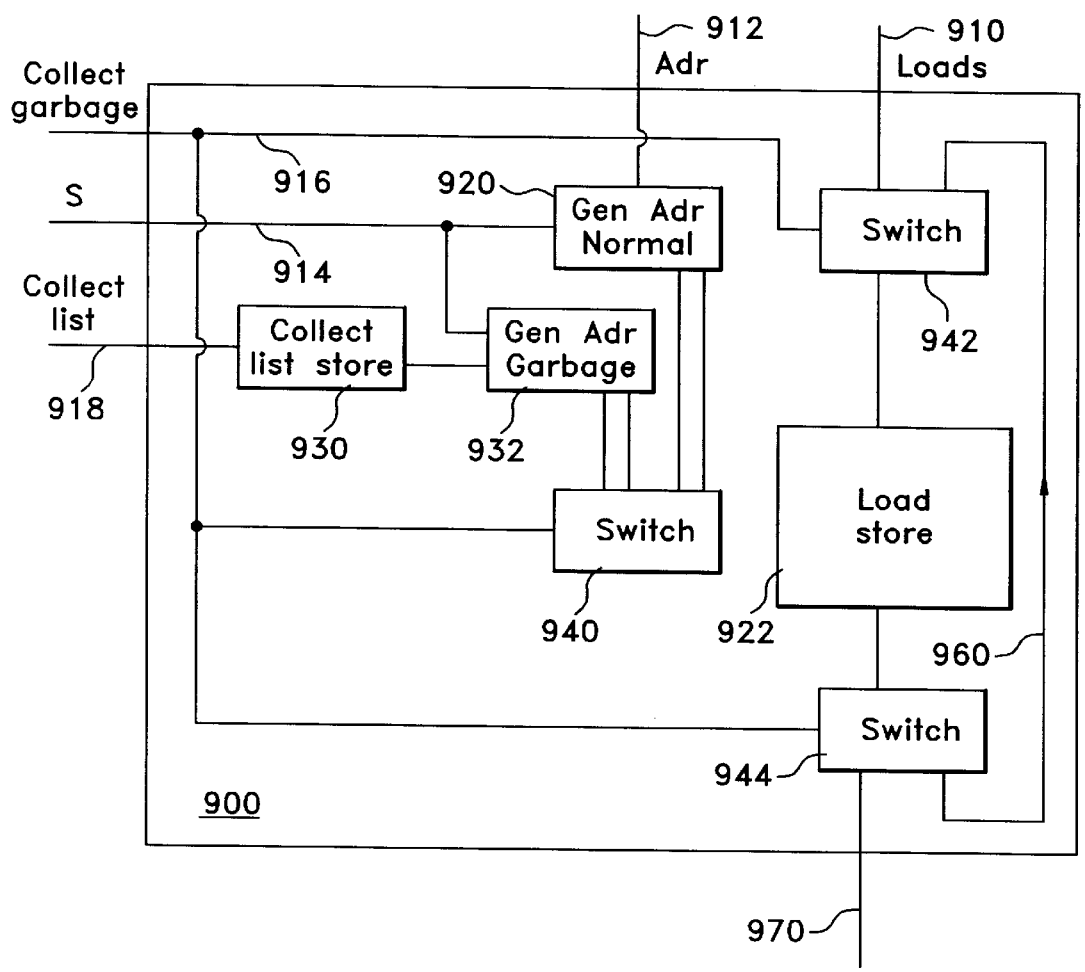
FIG. 9 shows a garbage collection mechanism for the load stores.

FIG. 9 shows a circuit for garbage collection. The circuit 900 consists of one load store and associated address generating logic. It can be operated in normal mode, accepting loads 910 and their addresses 912 in the load store 922 while outputting loads 970. If a run length coded representation of the S field, as shown in FIGS. 5b, 5c and 5d and e, is used, then the S field value from the pipeline is also needed as input 914 when operating in normal mode. It can also be switched to operate in a garbage collection mode by an input signal 916. Before garbage collection can take place, a list of which holons to take away 918, or alternatively a list of which holons to keep, is downloaded in the collect list store 930. In the garbage collection mode, the input and output addresses from the normal address generator module 920 normally used to address the load store 922 are switched away by a switch 940. Instead, an address generator module 932 specially prepared for garbage collection is enabled. This first initializes both the input and output addresses to zero. Then the S field 914 is cycled through. Each time a holon is found that according to the collect list should be kept, then each RefEl in the run is cycled through, for each RefEl both the input and the output addresses are incremented, the output is directed by a switch 944 through a feedback transmission line 960 and a further switch 942, and written in the load store again. Other holons are skipped, thereby not being written back into the load store, and thereby being deleted.

For the case of implementing the load stores using two-port RAM of such speed that the required output rate from the load store does not exceed the maximum writing speed for the load stores, then the normal operation mode and the garbage collection mode may be combined, so that garbage collection is possible during normal operation.

The design of the pipeline may be changed according to the wanted performance of the decoder.

If the combination of possible clock rate, wanted output resolution and frame rate allows, then the pipeline may be multiplexed, in that two or more load stores share one physical pipeline channel.

For systems with high output resolution and high frame rates, then a hyper-systolic implementation may be preferrable. Using this design method, there is not one common pipeline clock, but rather each pipeline stage starts its processing as soon as the necessary input is present, and signals to the next stage as soon as the output is ready. The control design will be more complex, but higher throughput can be achieved.

There are several possible reasons for representing the loads in several resolutions. One is that the data themselves have low resolution; if the camera has low resolution, or if a motion estimation technique which encourages smooth motion fields is used, then some of the blush or smile factors will have low inherent resolution.

Another reason for representing loads in different resolutions is that the same bit stream may be decoded on decoders with different capabilities. The loads may be split in one group necessary for low resolution decoding and another optional group that may be added for high resolution decoding. The low resolution decoders then only decode the low resolution loads, while the high resolution decoders decode both the low and the high resolution loads.

Another reason is that the human eye has different sensitivity for resolution for different domains. E.g, for color sequences, it is well known that if the color is represented in a colorspace like YUV as used in the PAL TV system or YIQ as used in the NTSC TV system, the chromacity components, U, V and I, Q respectively, need less spatial resolution than the intensity, also called luminance or brightness, Y component.

Yet another reason is that different levels of error protection may be used. If it is not possible to secure the whole bit stream with sufficient error protection, because of limited bandwidth, limited processing capabilities or similar, then the low resolution part should be separated and given better protection than the high resolution part. Errors in the high resolution part, when suitably concealed, are visually much less distracting than errors in the low resolution part.

As the memory needed to implement the load stores may contribute significantly to the system cost, it is advantageous to exploit the low resolution when storing the loads.

Referring again to FIG. 4, the loads from load stores 414 pass through a spatial expand step 430 before being sent to a multiply module 446.

To keep the simple systolic data flow out from the load stores, it is preferable to design the expand module so that the readout logic for the load stores functions independently of the later expand module.

To maximize flexibility, the expand step is preferably equipped with an enable/bypass switch, which either let the data from the load store be expanded or let them pass unchanged through.

One preferred embodiment fulfilling the two above design goals is to interleave the low resolution loads in the load stores. For an example of how this works, consider a simplest possible upsampling implemented by duplicating values, and consider an example where this is done in the horizontal direction only. Then the expand step can be switched so that it based on every two consecutive input values either outputs the same two consecutive values on one output line and keeps the other output line to zero, corresponding to the bypass mode, or so it outputs two consecutive copies of the first input value on one output line and two consecutive copies of the second value on the second output line, corresponding to the enable mode.

The expansion can also be done with an upsampling of two both in the vertical and in the horizontal direction, so that each group of four values input will produce either four values on one output line, in bypass mode, or four values on four output lines, in enable mode.

Resampling methods giving smoother output and thereby introducing less harmful artifacts in the image, e.g. bi-linear interpolation, can be found in the book "Digital Image Warping", already mentioned above. These methods base each output value on more than one input value. This means that the expand module must have a small amount of memory, from one value for the simplest linear interpolation based horizontal upsampling up to one scan line for bi-linear interpolation.

The expansion module can be implemented so that expansion can be applied to selected holons only. In this case there must be an expand setup store 426 that for each expand module stores one bit for each holon, which may be updated prior to each frame. Based on these bits and the S field values, each expand module is then set to enable or bypass mode.

To keep the S field values synchronized with the load values, the S field must be delayed according to the latency in the expand module using a delay module 440.

The expand module is not necessarily implemented for all load stores. To keep the synchronization of the pipeline, values that are not sent through an expand module must also be sent through a delay module 432.

Expand modules can be cascaded; delay modules must then be dimensioned correspondingly.

The encoder may compress the expand setup. On the decoder side, the expand setup must be decompressed correspondingly in an expand setup decoder 424. One possible compression method is to transmit the difference from the previous setup, and to encode this difference with run length and variable bit length coding.

The operation of the score store 442, the multiply module 446 and the corresponding delay module 450 is similar to the first preferred embodiment. One optimization is possible, however. For the case of a run length coded S field, the scores need not be looked up and fetched from the score store 442 for each pipeline clock pulse. Rather, since the S field value is constant throughout the run, the scores can be looked up and fetched at the start of each run only. This may allow higher clock frequency to be used, possibly at the small expense of a short pause between each run for initialization. The same principle may be applied also to most of the later steps in the pipeline.

The encoder may compress the scores. On the decoder side, they must be decompressed correspondingly in a score decoder 444. Known methods for compressing and decompressing time series may be used on each score separately. Such methods include differential coding, predictive coding and subband coding. Error concealment method may be used accordingly:

For differential coding, one concealment method is to repeat the previous score when a difference is missing. For predictive coding, one concealment method is to use only the predictor without a corrector when a corrector is missing. For subband coding, one method is to reconstruct the data without the erroneous coefficient if one is missing.

Alternatively, the scores may be compressed and decompressed in common. One method is to maintain a bi-linear model of the scores. Descriptions on how to form and update bi-linear models can be found in "Multivariate Calibration", H. Martens & T. Næss, John Wiley & Sons, Chicester 1990, which is hereby included by reference. Instead of transmitting the scores explicitly, the scores are again modelled as meta-loads, meta-scores and residuals. These are quantized, and may be coded using methods such as run length coding and variable bit length coding.

Another possibility is to use bi-linear modelling of scores for error concealment. On the decoder side, a bi-linear model of the scores is maintained. When scores data are erroneous, these are given weight zero for updating the model. The bi-linear model can then be used to reconstruct values for the missing data just by multiplying meta-scores with meta-loads.

For some applications, e.g. compression with extremely high compression ratios, there may not be sufficient band width to represent camera noise or other seemingly random patterns. In other applications where the model may have been produce using computer graphics methods, like simulators or games, the subjective image quality may be improved by adding camera-like noise. And further, because of quantization in the transmission of loads or in or after the frame buffer, dithering may be wanted. How to use random noise as a method for dithering can be found in "Fundamentals of Digital Image Processing", Anil K. Jain, Prentice Hall, 1989, which is hereby included by reference.

One preferred embodiment for how to achieve the goals given in the preceeding paragraph is to use a texture generator module 455. It produces texture based on filtering random numbers from a random generator 457. Examples on how to synthesize texture can be found in "Fundamentals of Digital Image Processing", mentioned above. The random numbers may be produced at the same rate as the speed of the pipeline. Filter coefficients, and thereby the character of the texture, such as intensity, may be controlled by values specific for each holon, stored in a texture setup store 452, updated prior to each frame.

Further, the filter coefficients may also be controlled in more detail spatially. By connecting a pipeline channel to the texture generator, the texture may be controlled per pixel.

An enable/bypass bit, similar to the one for the expand setup store, may also be stored in the texture setup store and thereby enable or bypass the texture for each holon. The pipeline channel, and thereby the load store, may therefore be used interchangably for texture control and for other information types.

The encoder may compress the texture setup. On the decoder side, they must be decompressed correspondingly in an texture setup decoder 454. One possible method is to transmit the difference from the previous setup, and to encode this difference with run length and variable bit length coding.

Data that do not pass through the texture generator must be correspondingly delayed, here shown by a delay module 456.

Within a limited total number of smile and blush factors, the optimal allocation of factors among the smile and blush domain will in general depend on the video sequences to be modelled. Some sequences contain much blush-like information and little smile-like information, in which case it may be optimal to have many blush factors. Other sequences contain much motion. In this case it may be optimal to have many smile factors. In the presence of quick and complicated motion, the psycho-visual spatial resolution of human eyes is poor, so blush factors, if present, may be stored in low resolution.

It is therefore not necessary to dimension the number of load stores according to the worst case for smile considered on its own plus the worst case for blush considered on its own. A lower number of load stores can be chosen. But this creates a need for redirecting the contents of the load stores so they end up in the correct domain for a move module 492. For this purpose, a router is used. It can be implemented as a crossbar switch, with ability to connect any of its inputs to any of its outputs.

In its simplest embodiment, the router can only be set up for each frame, such that the distribution between number of smile and blush factors is constant for all holons.

In a more advanced embodiment, the router can have one setup for each holon. This setup is stored in a router setup store 462 which is updated before each frame. The router setup store is organized in one row for each holon and one column for each output channel from the router. Each number stored in the router setup store specifies which input pipeline channel the output should be connected to the output channel. E.g, if a number in the second row, third column is 4, it means that each time an element belonging to holon 2 is processed, the value output for output channel three shall be fetched from input channel 4.

One preferred embodiment is to place a router after the expand modules 430, but before the multiply module 446, and also to let the router have the ability to connect any of its input to more than one output. This has the advantage of allowing the content of one load store to influence more than one domain of the output image, with a controllable amount of influence in each domain. As an example, referring to FIG. 2, consider a situation where color images in the RGB color space are created, and also assume that the blush factor 212 not only affects the red channel, causing the cheeks to become more red, but also causes the same area to become slightly more green and slightly less blue. In this case, this could be represented as one load, but with individual scores for the red, green and blue color channel. This mechanism can be implemented by routing the one load stored in the load store to three different pipeline channels, allowing the values to multiplied by different scores later.

It is also possible to have similar linkings between smile and blush. Assume that a light source was placed in the ceiling when the sequence of FIG. 2 was photographed. Assume also that the person now and then bent forward, corresponding to a downwards smile factor. This would darken the face because of change of angle of light incidence and because of shadow corresponding to a darkening blush factor. One load could therefore be used both for smile and blush.

Another preferred embodiment is to place a router 463 after the texture module 455, but before the sum smile module 474 and the sum blush module 476. This has the advantage of allowing texture to be switched between smile and blush domain. An example of texture in the blush domain has already been given. For an example of texture in the smile domain, assume that a snowfall has been photographed. Each snow flake is visible, and moves so slowly that it is possible to follow each snow flake at least for a short time while it is falling, but still its path is so complex that it is not possible within the given compression ratio constraints to represent the path of every individual snow flake in the encoded bit stream. It would then be possible to reconstruct an impression of dancing snow flakes by applying a texture component in the motion field.

The encoder may compress the router setup. On the decoder side, they must be decompressed correspondingly in an router setup decoder 464. One possible method is to transmit the difference from the previous setup, and to encode this difference with run length and variable bit length coding.

It can be decided that not all factors need the routing capability. For example, one could have a system where there would be at least one blush factor for each of the color channels r, g and b. Another example would be to always have at least one smile factor for each of the dimensions v and h, shown in FIG. 4 as a signal 459 going directly from the multiply module 446 to the sum smile module 474, suitably delayed in a delay module 458 to account for the latency in the router 463.

In this second preferred embodiment, as opposed to the first preferred embodiment, FIG. 4 indicates a connection between a loop v,h module 472 and the S field store 420. This is for the case when the S field, and correspondingly the loads, are run length coded. The reference position address can then not be found by looping v and h from values initialized to zero at the beginning of each frame. Rather, the loop module must be initialized to the correct coordinates at the start of each run by being initialized with v, h values 532, 534 from FIG. 5b, similar values 551, 552 from FIG. 5c, or similar values 592, 594 form FIG. 5c.

The transmitted loads must be quantized, both in values and in resolution, and the multiply 446 and sum 474, 476, 478 modules have limited accuracy. To allow the hardest possible quantization, which gives good compression, and to allow a smallest possible accuracy, which allows simple hardware in the multiply and add modules, all operations should be carried out in a well behaved color space. The C.I.E. uniform color space, as defined in "Fundamentals of Image Processing", already mentioned above, is a good colorspace to these respects but demands a nonlinear transform. Other color spaces, like YUV, perform less well but have simpler implementations.

For the case that the frame or field buffers 497, 498 must operate in RGB and that there is two way communication between the move module 492 and the frame or field buffers, then a color space converter placed after the move module in the pipeline must be able to convert both ways between the move module and the frame or field buffers. To avoid this, and to only demand a one way color space converter, one preferred embodiment is to place a color space converter immediately before the move module in the pipeline. In FIG. 4, this is exemplified with a YUV2RGB module 487, which converts from the YUV color space to the RGB color space.

Figure 7:
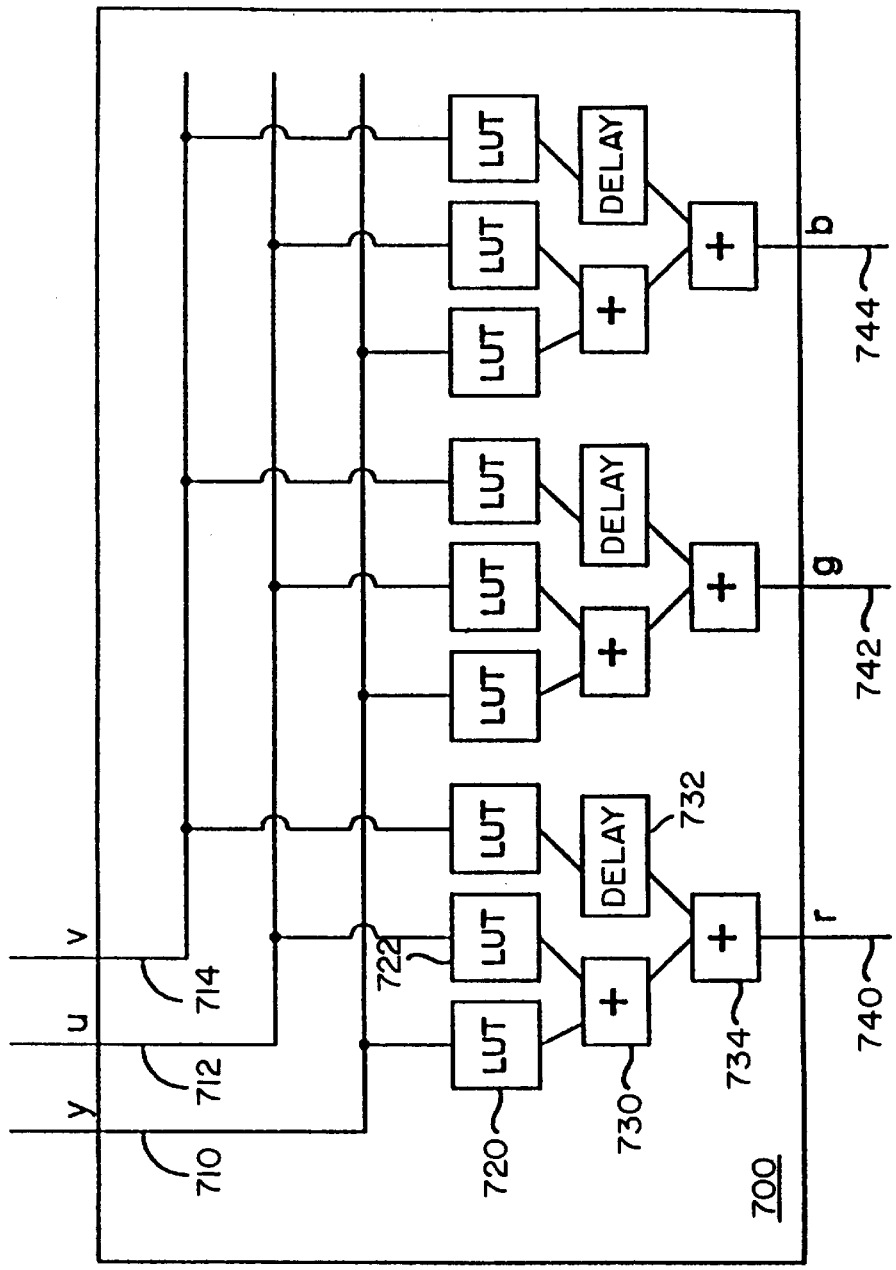
FIG. 7 shows a color space converter for converting from YUV to RGB.

FIG. 7 shows the inner workings of the YUV2RGB module 700. The module 700 receives the color signal consisting of y 710, u 712 and v 714 as input. Each output, r 740, g 742 and b 744 is made up of a weighted sum of the inputs. The weighing can be done using look up tables 720, in short LUT. The sum can be made using adder 730, 734, and, if necessary for synchronization, delay circuits 732.

In the first preferred embodiment, the move module 360 used a very simple strategy to decide which pixel should prevail when more than one pixel ended up at a certain position in the frame buffer or field buffer, namely first-win or last-win.

To allow better freedom in the ordering of the holons, a Z buffering algorithm can be used. The book "Principles of Interactive Computer Graphics", already mentioned above, describes how this is done using the name "depth buffering". In one preferred embodiment, this can be achieved by assigning each holon a depth, or Z, value. The direction of the depth dimension is chosen arbitrarily to be so that larger values correspond to nearer to the observer. A Z store 741 is updated prior to each frame. This is organized so that using the holon number as index, a Z value can be read out. For each pipeline clock pulse, or for each run for the case of a run length coded S field, the S field value is used as an index. The Z field value thereby found is sent to the move module 492, where it is used to determine if the corresponding pixel is visible.

The encoder may compress the Z values. On the decoder side, they must be decompressed correspondingly in an Z decoder 468. One possible method is to transmit the difference from the previous setup, and to encode this difference with run length and variable bit length coding.

Instead of having a Z value that is constant over a whole holon, the Z value can be given individually for each pixel in a load store. A load store is used for this. Using the multiply module 446 the field can be scaled. Since this corresponds to a change in an address component, namely the depth address component, this defined as the Z component of smile.

Like the vertical and horizontal components of smile, also the depth component Z can have more than one factor. The sum smile module 474 must in this case be designed accordingly, using three adders, one for each dimension.

For multi-factor Z, it is possible to let the first factor be holonwise constant values from the Z store 471.

The motion compensation using smile factors is a very powerful mechanism, in that a very rich range of different motions can be represented. However, it also is a very costly mechanism, in that the smile loads have to be transmitted and stored. Many motions are of much simpler nature, and can therefore be described more compactly. One technique for representing motion is the use of affine transforms. A description of affine transforms in both 2 and 3 dimensions can be found in the book "Principles of Interactive Computer Graphics", already mentioned above.

Since affine transforms can be used to model stiff objects, affine transforms are in this patent called nod transforms. The corresponding verb, "to nod", refers to applying an affine transform.

One preferred embodiment is to let the nod transform operate in 2D. In this representation, each nodded coordinate equals the old v and h component of the old coordinate transformed using a 3×3 matrix.

Another preferred embodiment is to let the nod transform operate in 3D. In this representation, also the Z value of each pixel is used.

The nod mechanism can be combined with the smile mechanism. One preferred embodiment is to form the coordinates going into the move module 492 as the sum of smile and nod. This can be implemented by forming smile displacement according to FIG. 3, while at the same time sending sending the v, h coordinates from the looper to a nod module. The new coordinates equals the sum of the smile and nod contributions.

Another preferred embodiment is to nod smiled coordinates, as shown in FIG. 4. Here, the v,h coordinates from the loop module 472 and the contributions from the smile factors are used to produce smiled coordinates by the sum smile module 474. The resulting coordinates are further nodded by a nod module 486. The applied nod matrices are given holonwise and stored in the nod store 482, and for each pipeline clock pulse, or for the start of each run, the S field value is used to index the nod store 482 such that the wanted nod matrix is transferred to the nod module.

Figure 8:
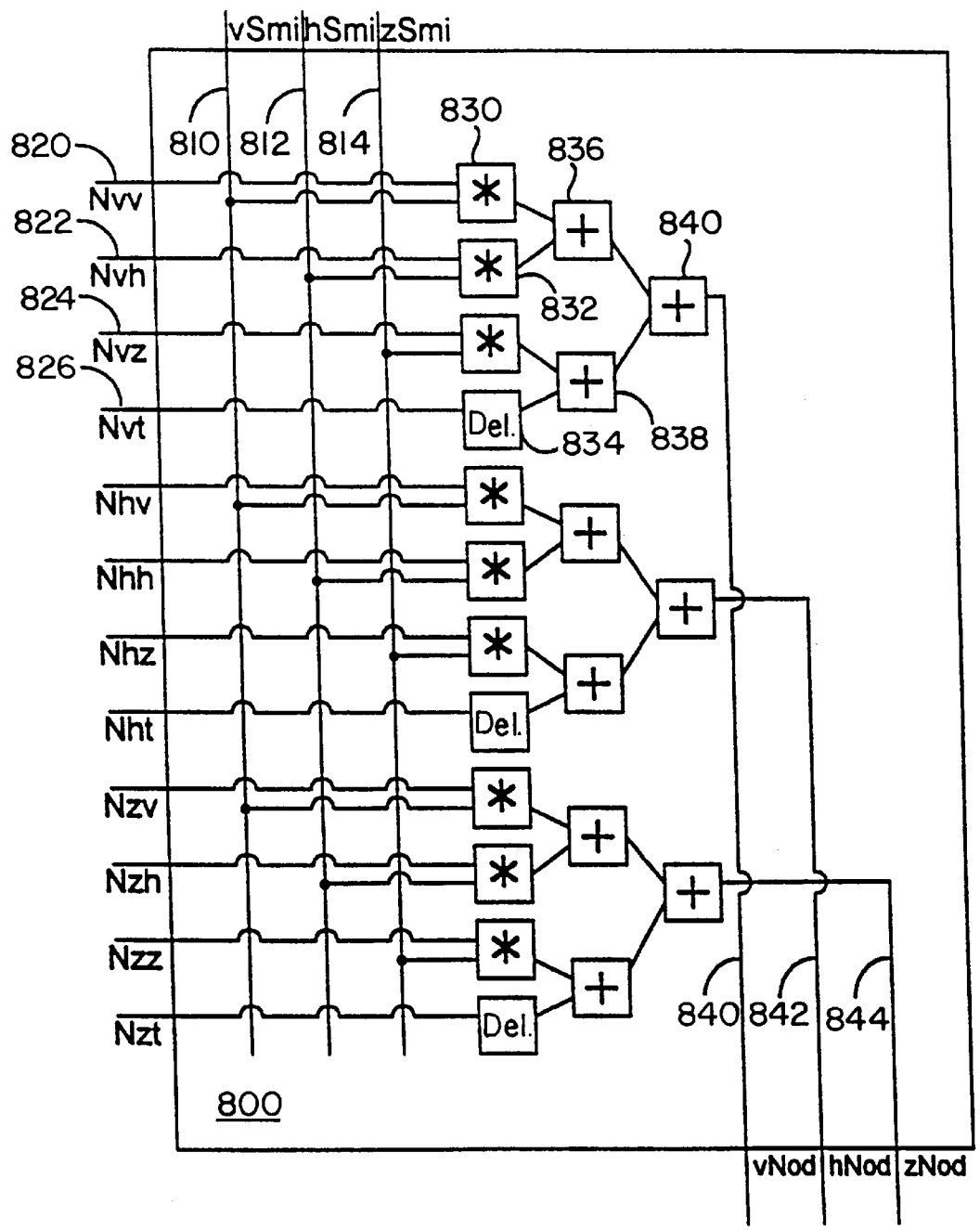
FIG. 8 shows a Nod circuit for applying affine transforms.

FIG. 4 also illustrates the use of 3D nod, in that not only the v and h components of coordinates are used, but also the depth component z. A more detailed drawing of the nod module 486 can be found in FIG. 8. The nod module 800 accepts smiled coordinates vSmi 810, hSmi 812 and zSmi 814 as input, and gives out smiled and nodded coordinates vNod 840, hNod 842 and zNod 844.

This expression is implemented:

$$\begin{bmatrix} NVod \\ HNod \\ ZNod \end{bmatrix} = \begin{bmatrix} Nvv & Nvh & Nvz & Nvt \\ Nhv & Nhh & Nhz & Nht \\ Nzv & Nzh & Nzz & Nzt \end{bmatrix} + \begin{bmatrix} VSmi \\ HSmi \\ ZSmi \end{bmatrix} + \begin{bmatrix} Nvt \\ Nht \\ Nhz \end{bmatrix}$$

vNod 840 is formed by multiplying Nvv 820 with vSmi 810 in a multiply module 830, multiplying Nvh 822 with hSmi 812 in a multiply module 832, Nvz 824 with zSmi 814, and summing these three intermediate results together with a suitably delayed 834 version of Nvt 826 using a three structured adder 836, 838, 840.

It is possible to let an IDLE encoder generate a bit stream that can be decoded according to several different frame resolutions, but still using only one set of loads and scores.

One use of this could be to generate video signals suitable both for PAL based TV sets as used in parts of Europe, NTSC TV sets as used in USA and personal computers.

Another use could be to allow zooming and panning or other ways of selecting part of the image while decoding. One special case of this is when a film is transmitted or stored with 16:9 width/height ratio, but must be viewed on a 4:3 screen. Traditionally, either only the center part of the 4:3 screen has been used, leaving black edges on the top and the bottom of the screen, or the central part of the 16:9 image has been selected, which means that action taking part on the sides are always lost. A better solution would be to track in which part of the 16:9 image the most interesting action takes place, embed this information in the transmitted bit stream, and then select this part on the 4:3 screen.

This can be done using nod. One method is to embed in the bit stream one set of nod matrices for each decode format, and let the decoder choose and use the appropriate nod matrices. Another is to encode according to one specific standard, and then let the decoder modify its nod matrices before applying them to RefEls. This can be done by multiplying each nod matrix with a matrix containg, as shown in the book "Principles of Interactive Computer Graphics". This method has the advantage of requiring modification of the nod matrices only. This is an operation that takes place only once every frame for each holon, so if the control processor 404 is implemented as a general purpose microprocessor and has spare capacity to perform this conversion, this methods requires no additional hardware except for communication paths between the nod store 482 and the control processor.

Figure 10:
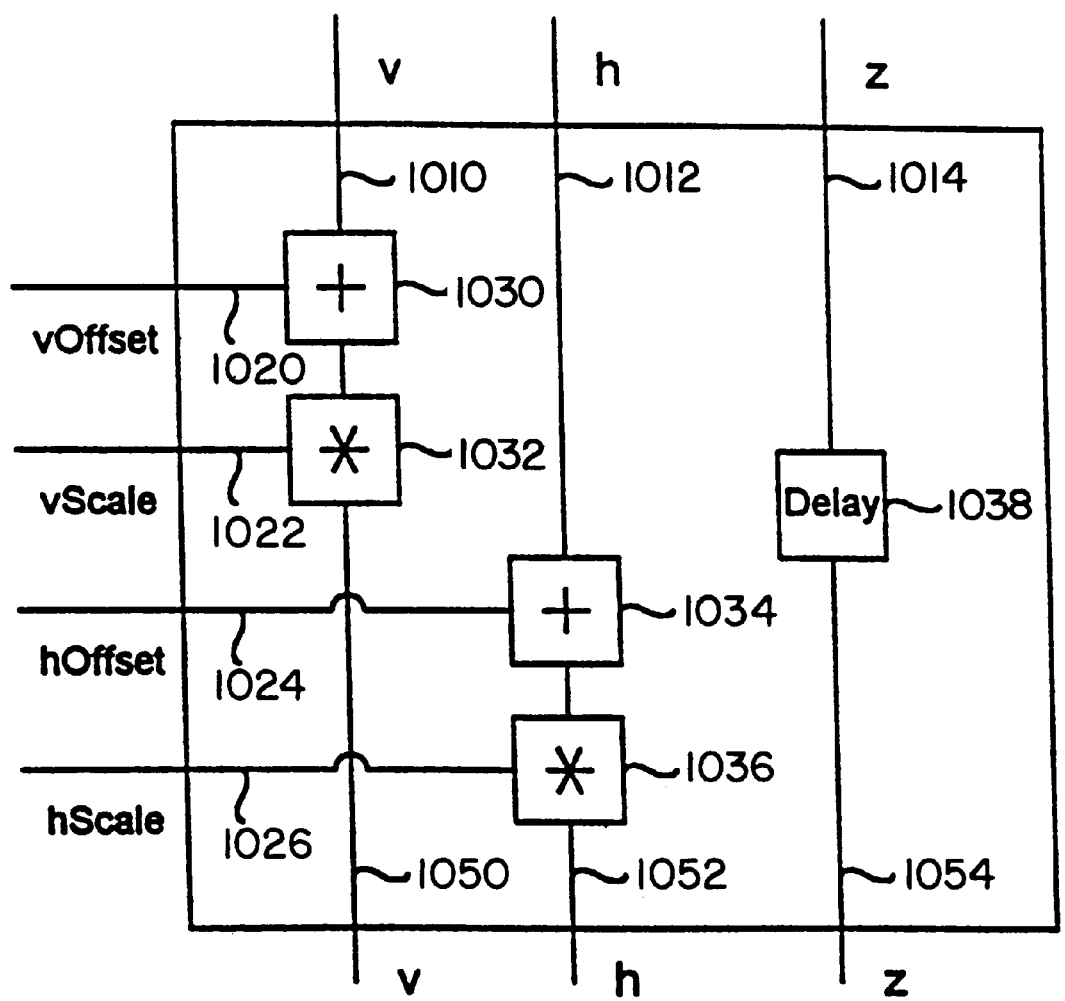
FIG. 10 shows a module for adapting the output format with regard to resolution.

This could also be done as a separate step. In FIG. 4, an adapt format module 491 has been indicated as acting on the coordinates coming from the nod module 486. FIG. 10 shows a more detailed view of this module. v 1010, h 1012 and z 1014 for a RefEl arrives every pipeline clock pulse. A vertical offset vOffset 1020 is added in an adder 1030 to the v coordinate, corresponding to a vertical pan or translation of the image. A vertical scale vScale 1022 is then multiplied in a multiply module 1032 with the result of the previous operation, corresponding to a zoom or scaling of the image. The result gives the final v coordinate 1050 of the current RefEl. A similar operation is done for the horizontal component, using an adder 1034 and a multiplier 1036 to handle a horizontal offset hOffset 1024 an a horizontal scale hScale 1026, producing the final h coordinate 1052 of the current RefEl. The z component 1014 must be delayed in a delay module 1038 correspondingly, so its output version 1054 has a timing compatible with the other components. This method has the advantage of being simpler to implement in the case that there is not sufficient spare capacity in the control processor. A further advantage is that it can be used in systems designed without the nod module 486 of FIG. 4. It can be seen that the adapt format module 491 implements an affine transform, though not all possible degrees of freedom in a general affine transform are implemented.

Since the smile, nod and adapt format modules all operate on addresses only instead of generating images or pixels as intermediate results, there is a minimum loss of resolution due to resampling.

The encoder may compress the nod matrices. On the decoder side, they must be decompressed correspondingly in a nod matrix decoder 481. One possible method is to compute the difference from the unity matrix, quantize, and then encode this difference with run length and variable bit length coding.

A decoder equipped for 3D nod can be upwards compatible with a decoder equipped only for 2D nod. This can be done by inserting zeros in the nod matrix, thus disregarding the Z values.

In the previous paragraph, it was assumed that when a pixel was placed in front of an already computed pixel, the new pixel completely covered the old pixel. This assumption can be relaxed, another possibility is that the new pixel only partly covers the old pixel. In WO 95/08240, the degree of the new pixel affecting the old pixel is called Prob. Other sources often call this "alpha keying" or "opacity". A Prob of 1 makes the new pixel value replace the old, a Prob of 0 makes the old pixel prevail, while intermediate values produces a blending of the two values.

Prob values can be stored in a Load Store. Such sets of values are called Prob loads. All previously defined operations may be applied to Prob: It can be given individually for each holon, it can be stored in low resolution and then expanded in the expand module 430, it can have a score associated with it in the score store 442, it may have a texture applied in the texture module 455, and it can be routed by the route module 463. It may also be computed as a contribution from several Prob factors, in which case it needs a sum Prob module 478.

One way of using Prob is to make holons blend together at edges. This is sometimes called edge anti-aliasing. The underlying principle is that on the border of two objects, a camera is normally not able to capture one pixel as a sample of the brightness of only one of the objects and the neighbouring pixel as a sample of the brightness of only the other object. For at least one pixel on the border, a mixture will be produced. This can be simulated using a Prob factor. Since the S field is used to represent the border of a holon, this is also often a good estimate of the border of objects. It is therefore possible to produce a good estimate of a Prob representing the blending of holons by filtering of S fields. This result can then be used as one factor of the final Prob. In FIG. 4, this is shown as a S2Prob module 466, able to convert from S field to a synthetic Prob load.

It does so by filtering the S field. Filter coefficients of filter parameters, called S2Prob setup, provided by the encoder, are stored in a S2Prob setup store 465. The S2Prob setup can be transmitted in a compressed format; one possible method is for each frame to only transmit differences relative to the previous frame. Accordingly, the S2Prob setup must be decompressed in an S2Prob setup decoder 484.

Figure 11:
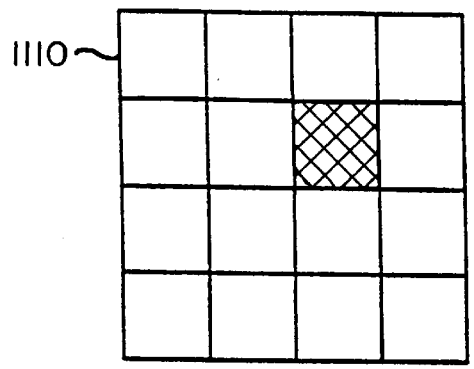
FIG. 11 illustrates the need for interpolation in the move module.
Figure 11:
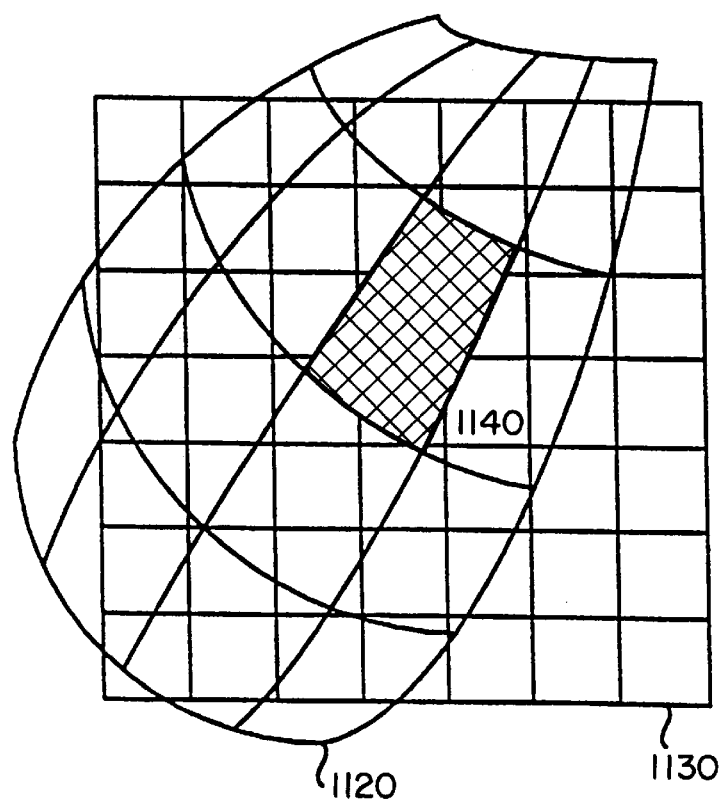

FIG. 11 illustrates one basic task for the move module 492: A holon, given as an image in local coordinates 1110 in its reference position, is moved according to its smile and nod parameters into its final frame position 1120 in the frame coordinate system 1130. A RefEl 1140 given in the reference position does not necessarily correspond to any specific pixel in the final frame; for the case of magnification, it could cover many pixels partly or completely, and for the case of minification, it could cover only a fraction of one pixel. One basic task for the move module is therefore to transform from the reference position coordinate system to the frame coordinate system such that the content of the reference position image is represented as well as possible in the final frame.

Figure 12A:
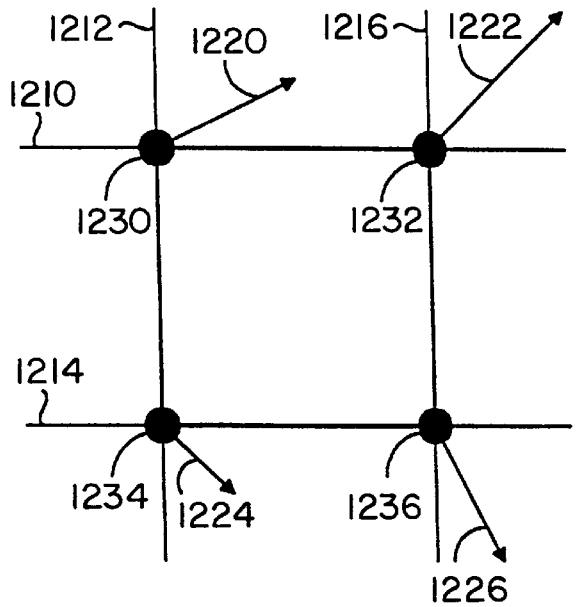
FIGS. 12a and b illustrate in detail what is done for 4 pixels in a move module.

FIG. 12a shows a detailed view of the situation for four adjacent RefEls 1220, 1222, 1224, 1226 on two successive scan lines 1210, 1214 and two successive colums 1212, 1216. Based on smile factors, and possibly also nod, motion vectors 1230, 1232, 1234, 1236 have been computed for the these RefEls. The motion vectors have sub-pixel precision. The intensity values for the RefEls are known from aggregating contributions from blush factors.

Figure 12B:
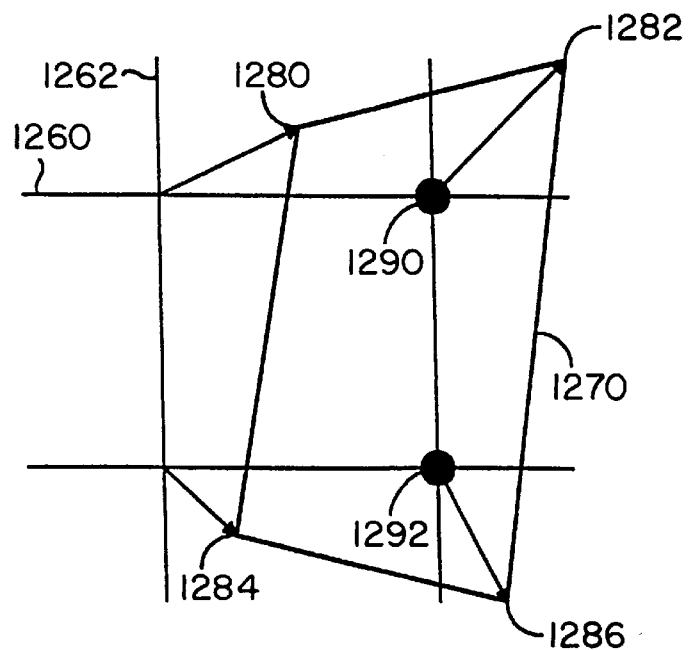

FIG. 12b illustrates the principle used in this embodiment. A final frame coordinate system consisting of scan lines 1260 and columns 1262 is shown. Intensity values at moved positions 1280, 1282, 1284, 1286 of the RefEls are known, but the moved positions in general do not correspond exactly to pixel positions in the final frame. However, these can be used to interpolate new intensity values at those pixel positions 1290, 1292 that are inside the area defined by a quadrangle 1270 with known values as corners.

Figure 13A:
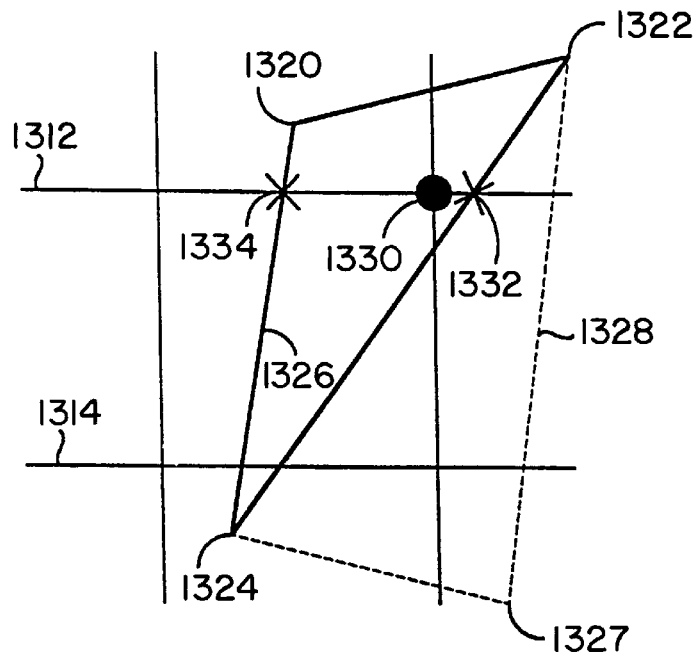
FIGS. 13a and b illustrate the principle of a move module based on triangles.

One preferred embodiment is illustrated in FIG. 13. Here, the quadrangle 1270 from FIG. 12 is split into two triangles 1326, 1328. The splitting may be according to a fixed rule; one possibility is to let the first triangle 1326 be formed by the RefEls which in reference position were upper left 1320, upper right 1322 and lower left 1324 of the four adjacent RefEls, while the second triangle is formed by the upper right 1322, lower left 1324 and the lower right 1327 RefEls. Each triangle may thereafter be computed separately.

Each scan line 1312, 1314 through the triangle 1326 is now treated separately. For each scan line, the horizontal coordinates of two intersections 1332, 1334 between the scan line 1312 and the triangle 1326 are computed, based on linear interpolation between pairs of known values 1320, 1324, 1322, 1324 based on the vertical index of the scan line 1312. Based on similar linear interpolation, intensity values may be computed for the intersections 1332, 1334. For each pixel position between the two sub-pixel precision horizontal coordinates, intensity values can be found by linear interpolation between the two intersections 1332, 1334 based on the horizontal position of the pixel. This intensity value is output from the move module.

Figure 13B:
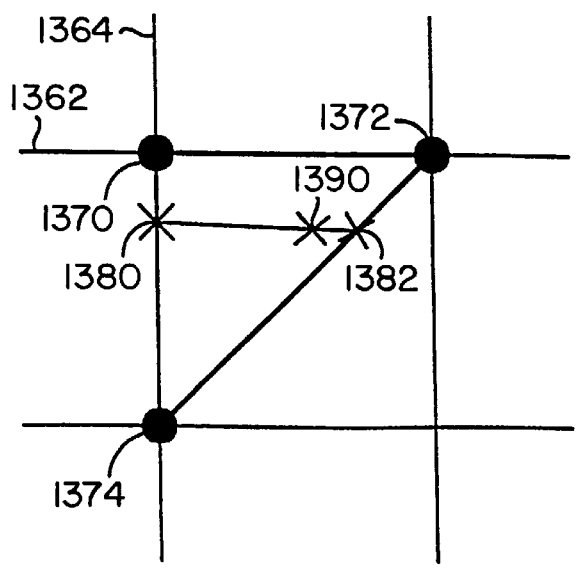
Figure 14A:
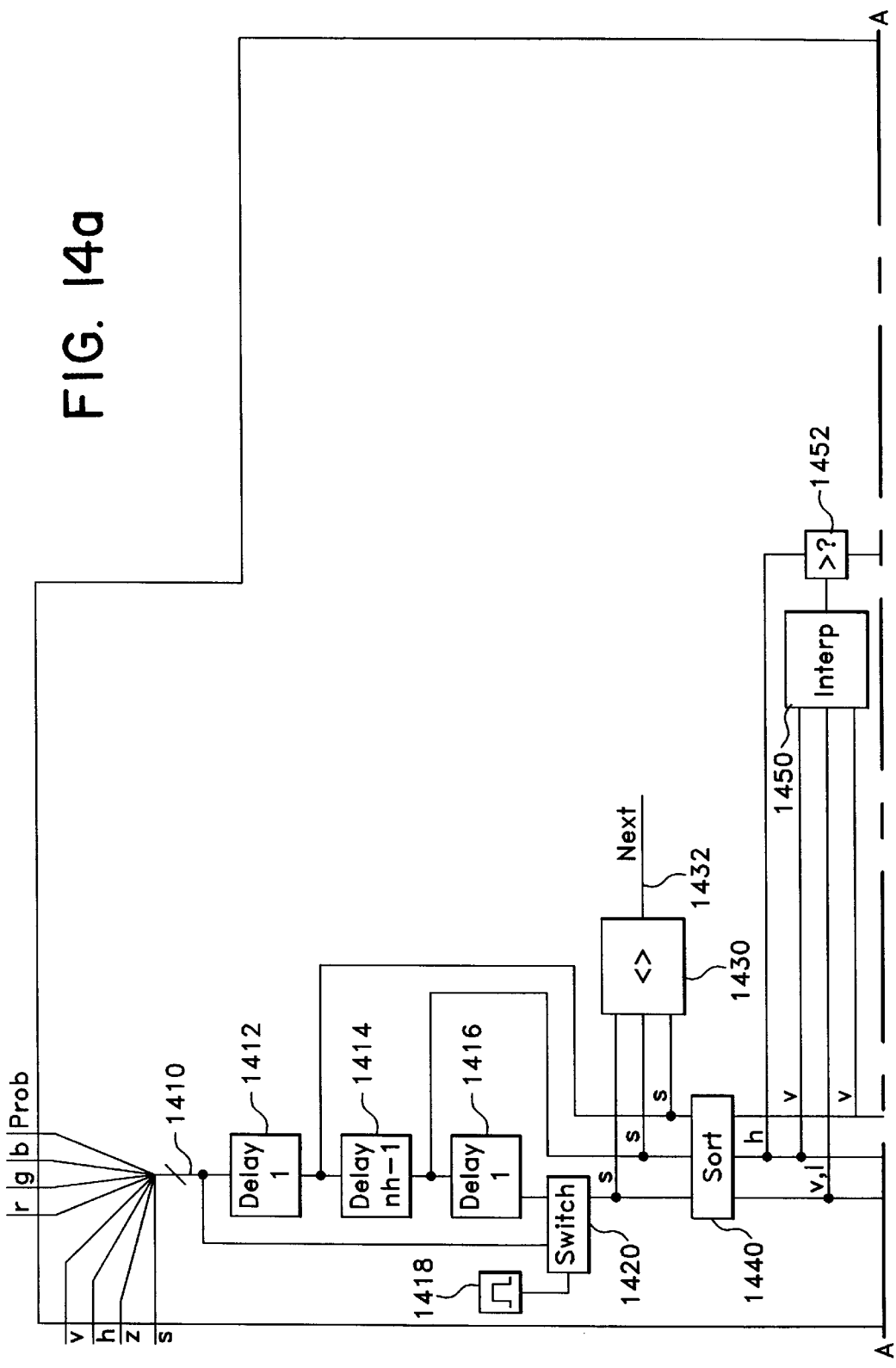
FIGS. 14a and 14b, which when joined together at match line A—A collectively make up FIG. 14 gives an implementation of a move module with progressive interpolation
Figure 14B:
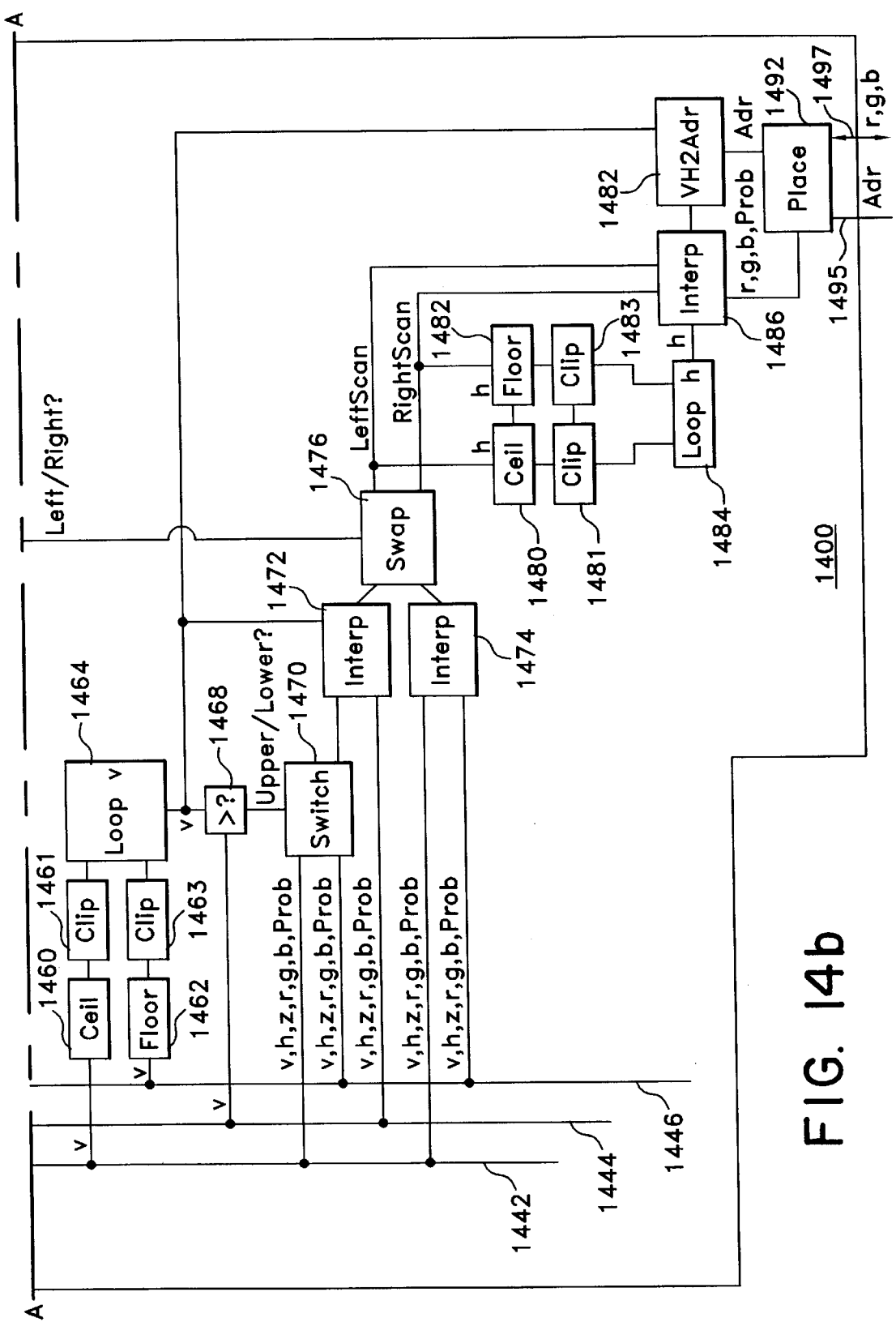

FIG. 14 shows an implementation of a move module 1400 based on this principle. Incoming r, g, b, Prob, v, h, z and S values from earlier pipeline steps are for simplicity shown as one bundle 1410 of values. The values are prepared in reference position scan order, so in order to at each move module clock pulse obtain four adjacent pixels as indicated in FIGS. 12 and 13, the incoming values 1410 are delayed 1412, 1414, 1416.

For the simple layout of the S field as indicated in FIG. 5a, the delays correspond to the length of the reference position scan lines. For the run length coded representation of the S field as indicated in FIGS. 5b, 5c, 5d and 5e, the run lengths must also be taken into consideration.

A toggle 1418 is used to control a switch 1420 such that first a triangle consisting of the upper left, upper right and lower left RefEls is produced, and then the triangle consisting of the upper right, lower left and lower right RefEls.

A comparator 1430 is used to check the S field values of the three RefEls of the triangle. If these values are not identical, this means that the RefEls do not belong to the same holon. In this case, no interpolation should take place between the pixels, and a signal 1432 is set to signify that the no further processing should be done for the current triangle and the next values should be clocked in.

In order to simplify later processing, the three RefEls are sorted according to their vertical position in a sort module 1440. This produces an upper RefEl 1442, a middle RefEl 1444 and a lower RefEl 1446. In degenerate cases where two or more RefEls have the same vertical position, than any ordering between them will work.

By rounding the vertical coordinate of the upper RefEl towards larger numerical value in the ceil module 1460, producing vUp, and the vertical coordinate of the lower RefEl towards smaller numerical value in the floor module 1462, producing vLow, the range of all scan lines that could pass through the triangle is obtained. Since the motion field can be such that values outside the frame can be generated, vUp and vLow must be clipped 1463. The action of the clip module 1463 is to replace vUp with zero if this is negative and to replace vLow with nv−1 if vLow is greater than this value.

The loop v module 1464 can now loop through the frame scan lines, from vUp to vLow.

Figure 15:
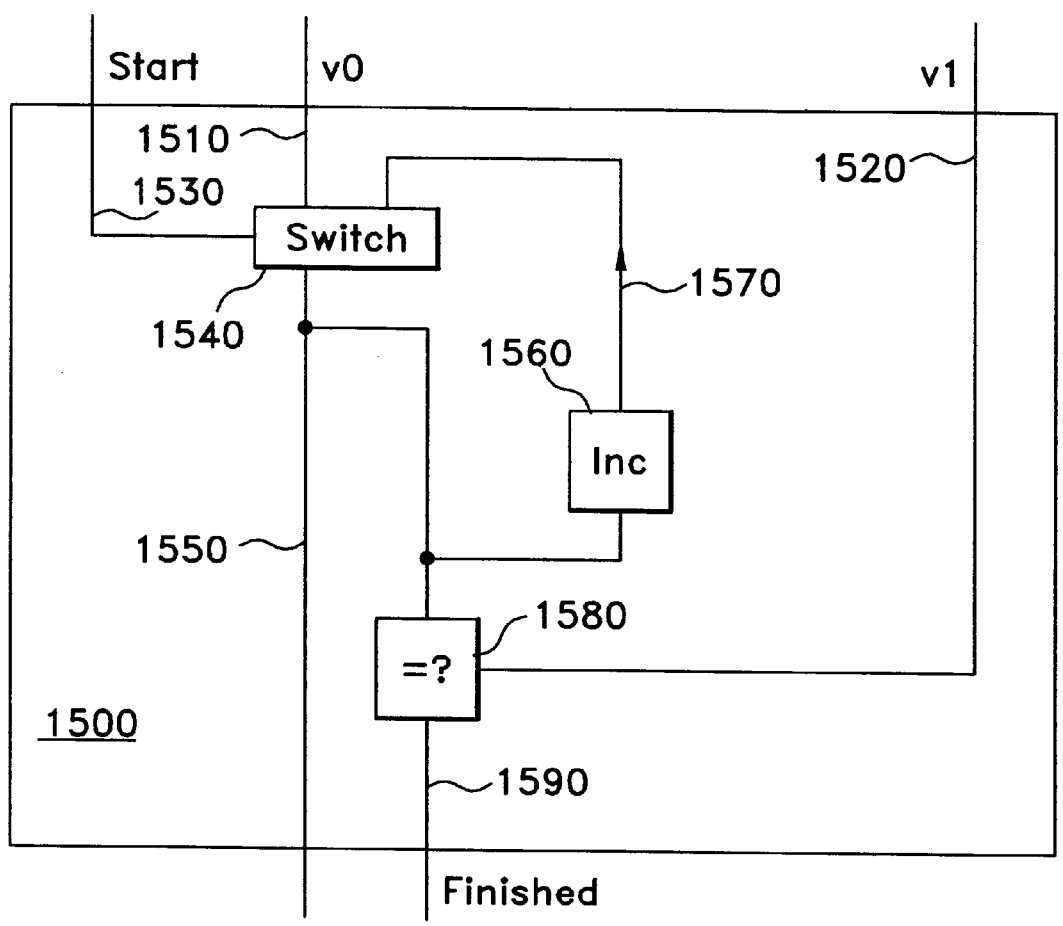
FIG. 15 shows a Loop circuit, to be used as part of the move module.

A loop module is shown in FIG. 15. It will loop from a first value v0 1510 to a second value v1 1520, starting at a start pulse 1530. The value will be incremented in an incrementer 1560 at each move clock pulse. The value will be fed back 1570. This will continue until the finish test 1580 is satisfied. A finished signal 1590 will then be output.

Going back to FIG. 14, it is now known that the current scan line goes through the triangle segment between the upper and lower RefEl, so h, z, r, g, b and Prob can be interpolated at this intersection by a interpolation module interp 1474. By checking the v coordinate of the middle RefEl against the interpolated h value in a comparator 1466, it can be found whether the remaining triangle intersection is with the upper or lower of the two remaining triangle sides. A switch 1470 uses the output from the comparator 1466 to fetch the values for either the upper or lower RefEl, which is then used together with the values for the middle RefEl to interpolate a value by another interp 1472.

Figure 16A:
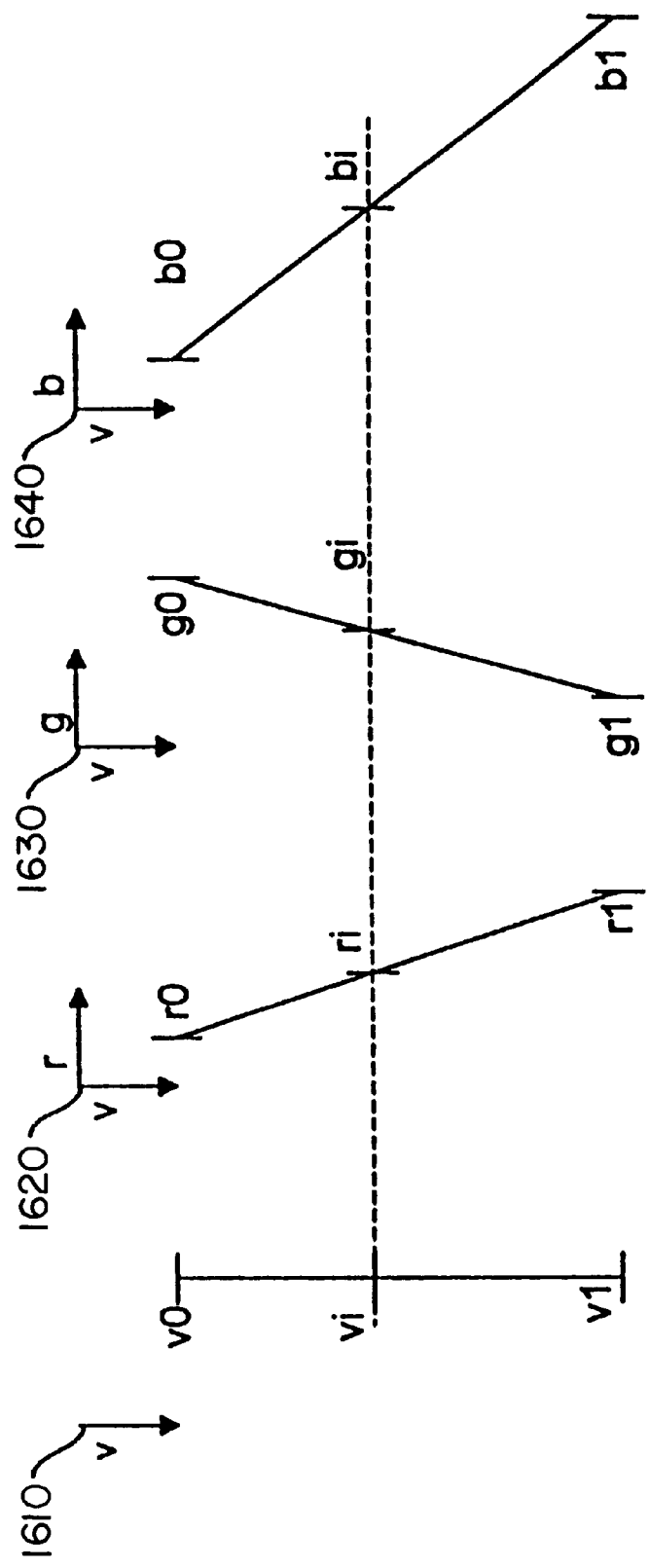
FIG. 16a shows the numeric principle for the Interpol circuit of the move module.

The numerical principle for the interpolation module 1474 is shown in FIG. 16a. Several dependent variables, in this example r, g and b, depend on one independent variable, in this example v. Values for the dependent variables are given for the end points of a certain interval of the independent variable. Based on an intermediate value vi of the independent variable, an interpolated value shall be found for each of the dependent variables. This is indicated by one ordinate system 1610 for the independent variable v, and one coordinate system 1620, 1630, 1640 for each of the dependent variables r, g and b. The intermediate independent value vi is then used the dependent value ri, gi and bi.

Figure 16B:
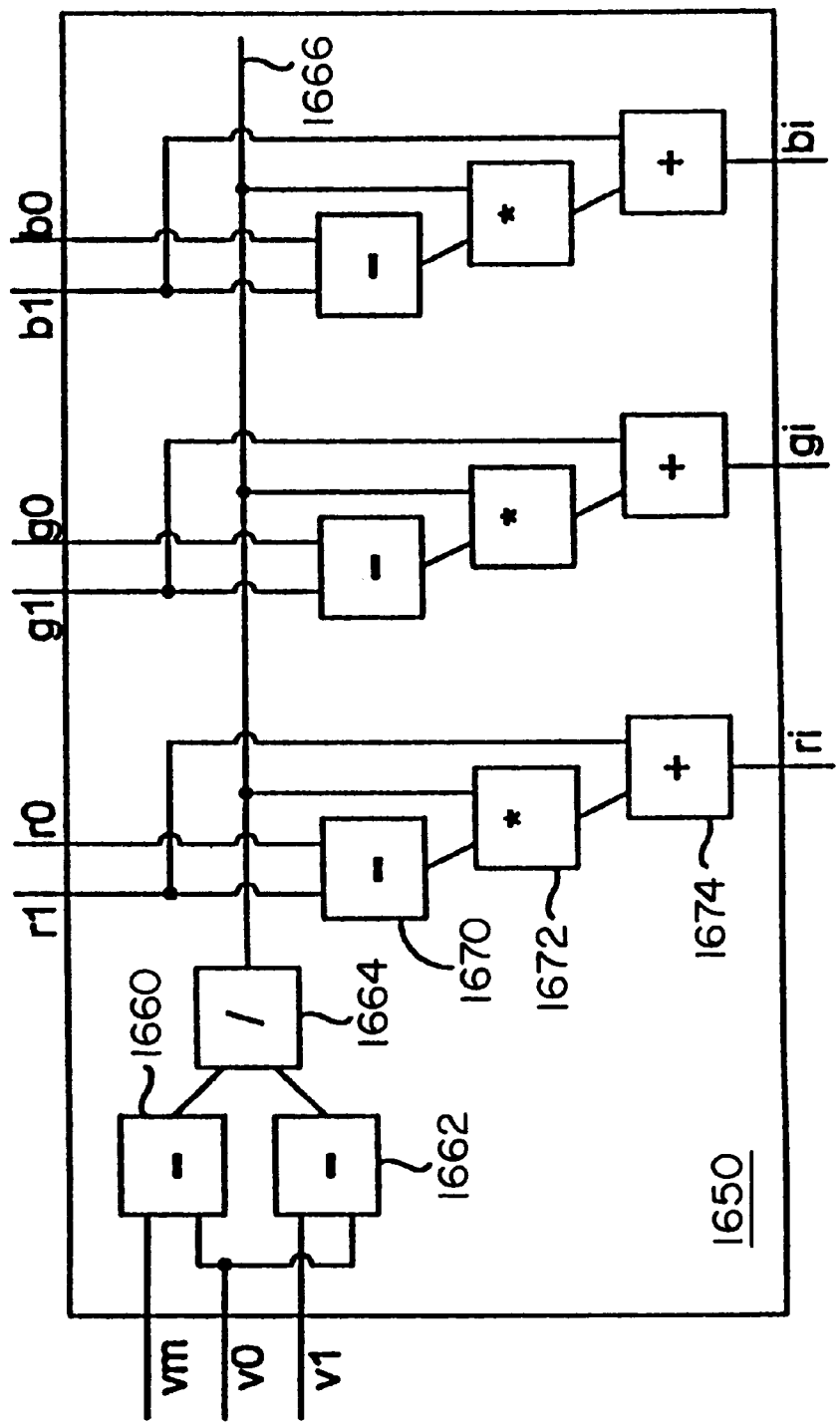
FIG. 16b gives an implementation for Interpol.

The hardware is given in FIG. 16b. The interpolation module 1650 accepts as input the values for the independent variables at the endpoints, v0 and v1, and an intermediate value, vi. The expression weight=(vi−v0)/(v1−v0), implemented by two subtractors 1660, 1662 and one divider 1664, gives the weight of the second end point for each of the dependent variables. For each of the dependent variables, e.g. r, this weight is used to form the interpolated value by the expression ri=(r1−r0)*weight+r0, implemented by a subtractor 1670, multiplier 1672 and an adder 1674.

Referring back to FIG. 14, for subsequent processing, it is useful to know whether the middle RefEl is to the left or the right of the triangle side between the upper RefEl and the lower RefEl. This is found by interpolating in an interp 1450 the h value at the line between the upper RefEl and the lower RefEl based on the v value of the middle RefEl, and then comparing this h value with the real h value of the RefEl. If the interpolated h value is greater than the h value of the middle RefEl, decided in a comparator 1452, then the middle value is to the right of the line between the upper and lower RefEl, and in this case the values for the two intersections with the triangle should be swapped in a swap module 1476 so that later looping of the h value can take place in a known order, here chosen to be increasing values, corresponding to generating pixels from left to the right.

The pixels along the scan line can now be generated. First the leftmost h value is rounded to the next whole pixel position to the right and the rightmost h value is rounded to the next whole pixel position to the left by rounding modules 1480, 1482. These values are then clipped against the frame size in a clip module 1483, where left h values smaller than 0 are replaced by 0 and right h values larger than the index of the rightmost pixel are replaced by this index.

A loop h module 1484 can now loop over these h values, if any. Based on these h values, values for r, g, b, z and Prob can be interpolated in an interpolation module 1486.

The v and h values from the v and h loopers 1464, 1484 can now be used to calculate the frame address of the current pixel in a VH2Adr module 1490. For frame buffer scan line lengths of powers of two this can be done by concantenation of bits; otherwise an expression like v*nh+v might be used.

The pixel values are then placed in the image by a place module 1492, using the generated address 1495 to update r, g and b values 1497.

Figure 17:
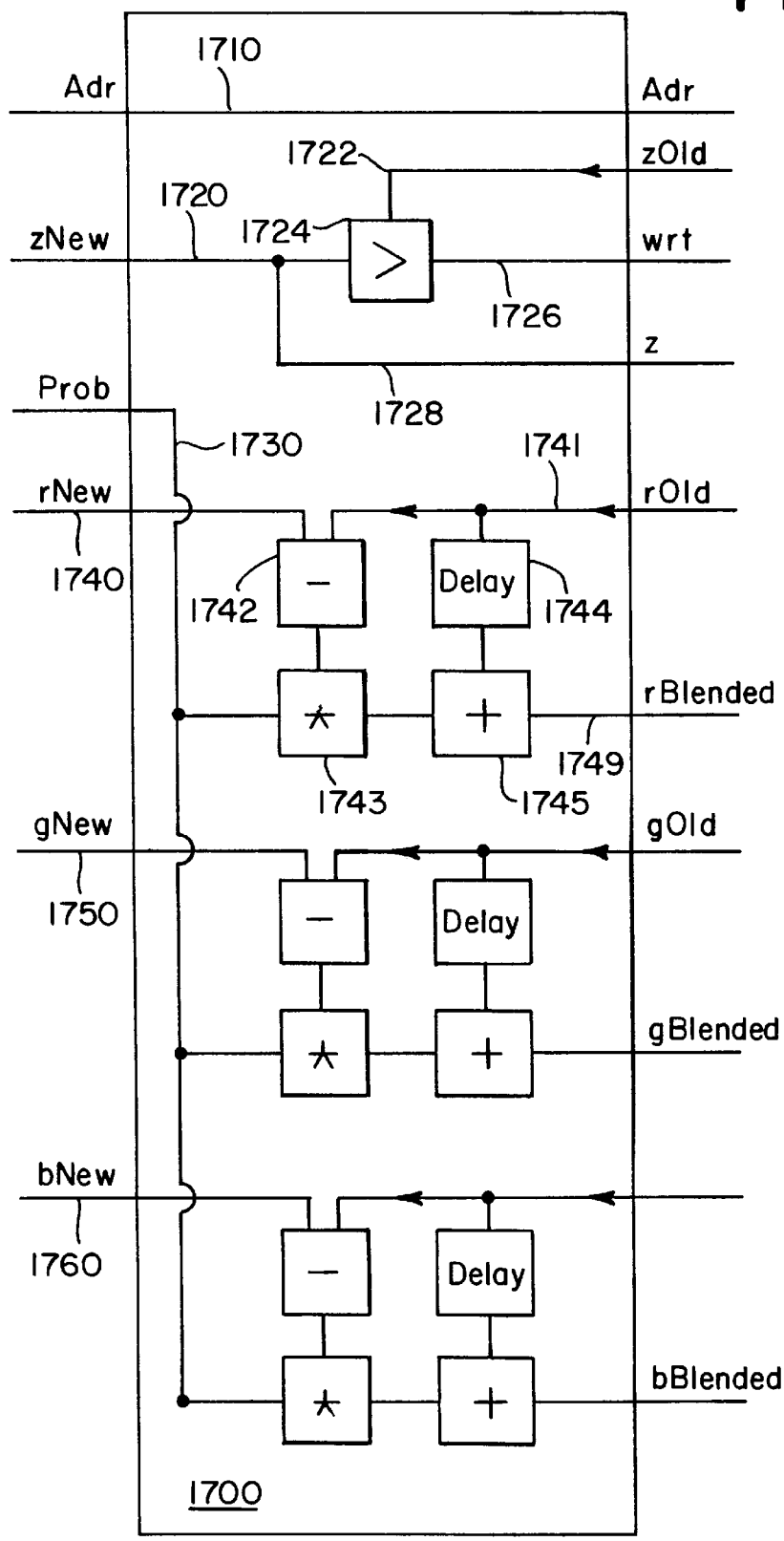
FIG. 17 shows a Place circuit, to be used as the last stage of the move module.

FIG. 17 shows a more detailed view of the place module 1492, designated with 1700. The address 1710, Z 1720, Prob 1730, r 1740, g 1750 and g 1760 value of the new pixel is given as input. The required action is to look up the Z value of any earlier pixels at this address, and if there are no previous pixels or if this pixel is in front of any previous pixels, then the pixel should be updated with a degree of change according to the Prob value.

The module functions as follows: The address 1710 is used to read a value from the Z buffer 496, and the old Z value zOld 1722 is returned back. zOld is compared with the new z value zNew 1720, and if zNew is larger than zOld then a write pulse 1726 is sent both to the Z buffer and to the frame buffer. The zNew 1728 is written to the Z buffer.

The new intensity values to be written, e.g. the value for the red component, are found by first computing the difference between the old red value rOld 1741 and the new red value rNew 1740 in a subtract module 1742, multiplying in a multiplier 1743 the difference with the Prob value 1730 to find the required amount of change wanted, and adding in an adder 1745 this change to rOld, suitably delayed in a delay module 1744 to account for the latency in the subtract module 1742 and multiplier 1743, before writing the resulting blended value for red 1749 back.

In the above, all the domains were interpolated first at each intersection between scan line and triangle and then at each pixel position along this scan line. Another preferred embodiment is to map the pixel positions in the frame back to reference position, and then do the interpolation based on values and distances in the reference position. FIG. 13b illustrates this principle. The example is the same as in FIG. 13a. The moved triangle 1326 between the thre moved RefEls 1320, 1322, 1324 in FIG. 13a corresponds to the reference position triangle in FIG. 13b between the same RefEls 1370, 1372, 1374 before they were moved. The leftmost intersection 1332 between the triangle 1326 and the scan line 1312 can be mapped to a corresponding point 1380, and similarly the rightmost intersection 1334 can be mapped to a corresponding point 1382. Based on these points, the pixel 1330 can be mapped back to a corresponding point 1390. Once the coordinates of this point 1390 are known, they can be used to interpolate values for each of the wanted domains, e.g. r, g, b, Z and Prob, and these interpolated values will then be output from the move module as values for the wanted pixel 1330.

Figure 19A:
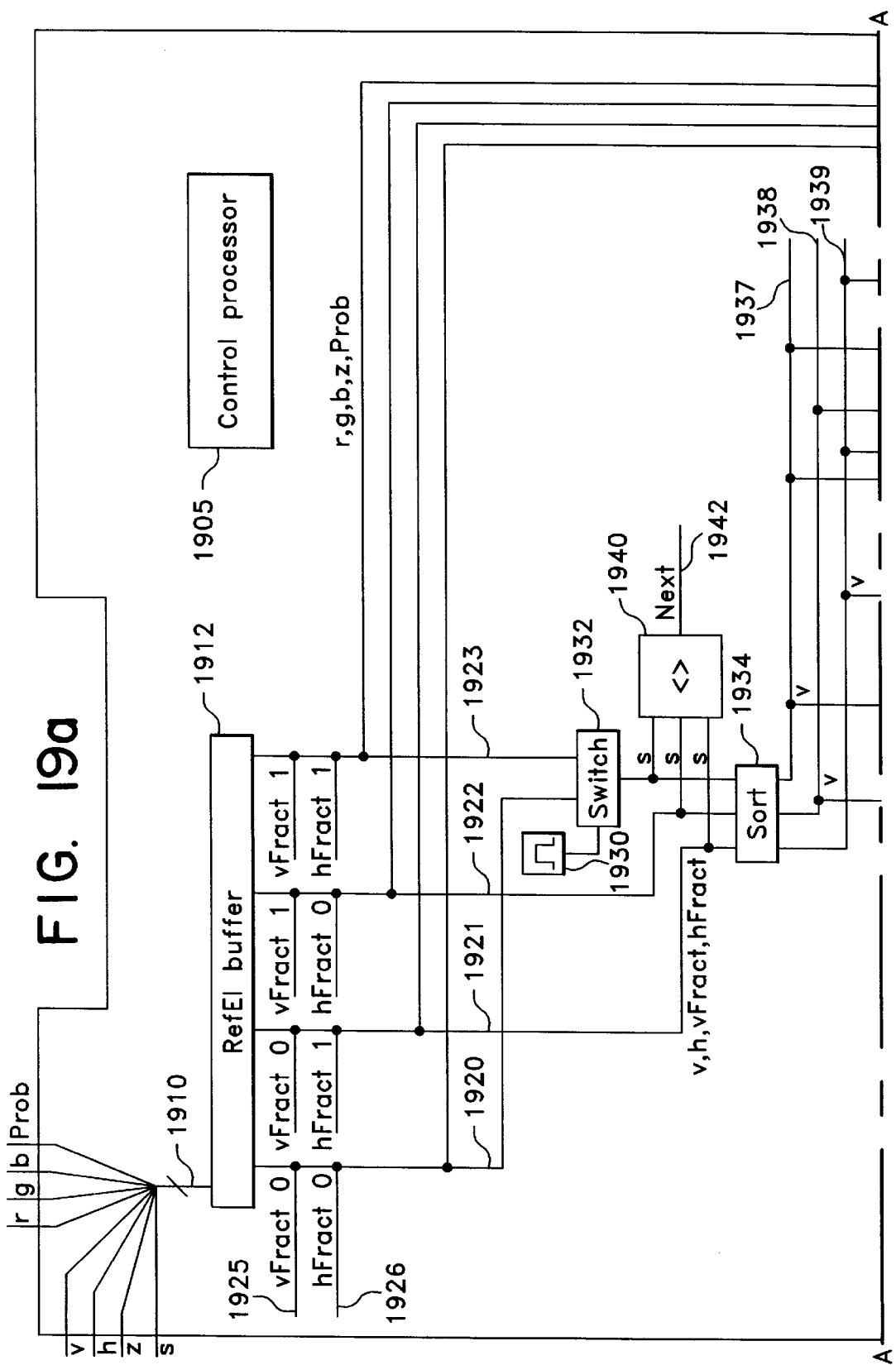
FIGS. 19a and 19b, which when joined together at match line A—A collectively make up FIG. 19 gives a hardware implementation of a move module based on backward mapping.
Figure 19B:
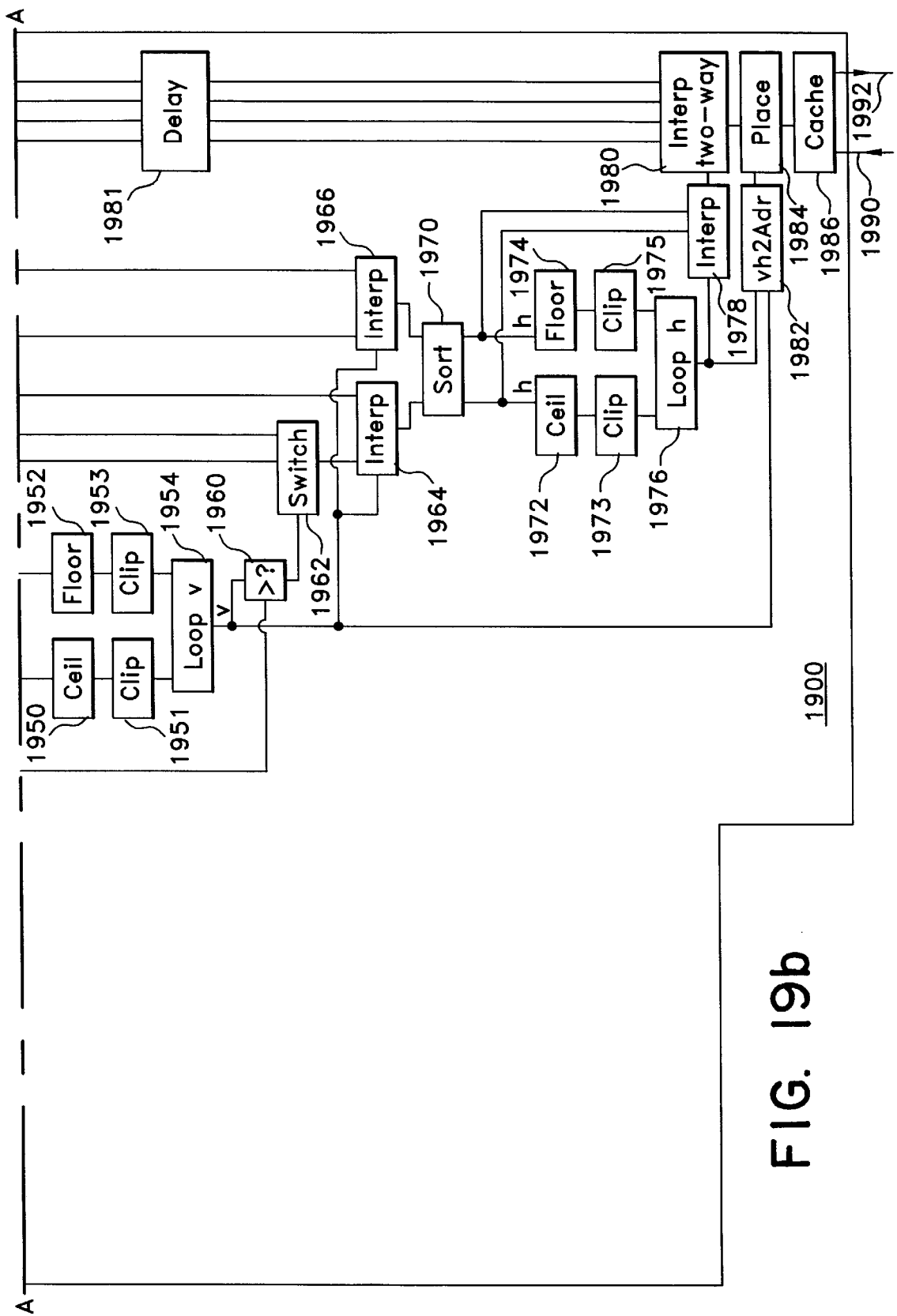

For a hardware implementation of this, refer to FIG. 19 showing an architecture for a move module 1900.

A control processor 1905 controls the timing and coordination of the circuit. Its interconnections with the various modules are not shown.

The incoming values v, h, z, s, r, g, b and Prob for a RefEl are shown as one bus 1910. By using time delays, a RefEl buffer 1912 produces the four RefEls 1920, 1921, 1922, 1923 corresponding to a quadrangle.

Values for vFract 1925 and hFract 1926 are supplied for each of the RefEls.

A toggle 1930 controls a switch 1932 so that the upper left and the lower right triangle are produced.

The S field value of the RefEls in the triangle are checked by a comparator 1940, and if the values are not the same, that is, if they do not belong to the same holon, then a Next signal 1942 is sent out to signify that the next triangle should be processed.

The RefEls are sorted by their v values in a Sort module 1934. After this Sort step, it is known which is the upper 1937, middle 1938 and lower 1939 RefEl, so that the order of these is not in conflict with the scan order of the final frame.

The v coordinate of the upper RefEl is rounded to next scan line in a ceil module 1950, and the v coordinate of the lower RefEl is rounded to previous scan line in a floor module 1952. These values are clipped against the vertical size of the frame in two clip modules 1951, 1953. A loop module 1954 loops from the first to the second of these two values, producing a current v value.

A comparator 1960 checks whether the current v value is larger than the v value of the middle point. The result of this check is used to control a switch 1962 that selects either the upper or lower RefEl, such that an interp module 1964 can use this upper or lower RefEl together with the middle RefEl, thereby operating on the upper or lower short triangle vertex, to interpolate values for h, vFract and hFract for the current v value.

An interp module 1966 likewise interpolates h, vFract and hFract for the long triangle vertex for the current v value.

The two values are sorted on their h order in a sort module, so that the two pixels appear in scan order for the final frame.

A ceil module 1972 rounds the h value of the leftmost RefEl up to the next pixel position, while a floor module 1974 rounds the h value of the rightmost RefEl down to the previous pixel position. The resulting values are clipped against the frame size in two clip modules 1973, 1975. A loop module 1976 loops from the leftmost to the rightmost of the two h values, thereby producing a current h value.

Based on the current h value, values for vFract and hFract are interpolated in interpolation module 1978. vFract and hFract now specify a sub-pixel precision position in the reference position coordinate system corresponding to the position of a pixel in a final frame. A module for performing two-way linear interpolation 1980 uses this sub-pixel precision position to interpolate r, g, b, z and Prob values between the corresponding values for the RefEls, suitably delayed in a delay module 1981 to adapt to latencies in computing the sub-pixel precision position. The current v, h values are converted to an address in a VH2Adr module 1982, and this address is used to place the r, g, and b values into the frame buffer by a place module 1984. The place module reads the old r, g, b an Z value 1990, and dependent on the Z and Prob value of the newly interpolated pixel, the r, g, b and Z values 1992 are updated.

A cache 1986 may be used to increase performance.

Figure 18A:
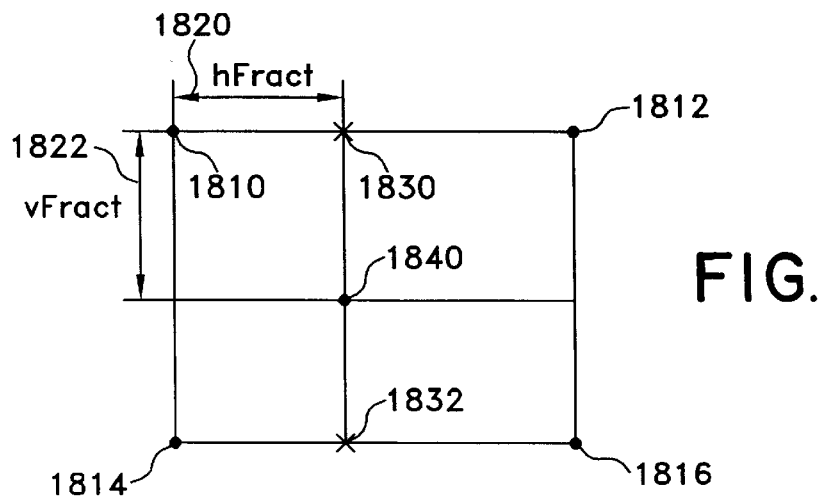
FIG. 18a illustrates the principle for two-way linear interpolation.

FIG. 18*a* describes the numerical basis for two-way linear interpolation. This is often called bi-linear interpolation in other sources. In this case interpolation for one dependent variable only is shown, but the principle applies also for several dependent variables. The position vFract 1822, hFract 1820 of a wanted value is known to sub-pixel precision between four known values r11 1810, r12 1812, r21 1814 and r22 1816. The wanted value can then be found by linearly interpolating one intermediate value 1830 based on the two upper known values 1810, 1812, and similarily one intermediate value 1832 based on the two lower known values 1814, 1816, and then again between these to to find the final result 1840.

Figure 18B:
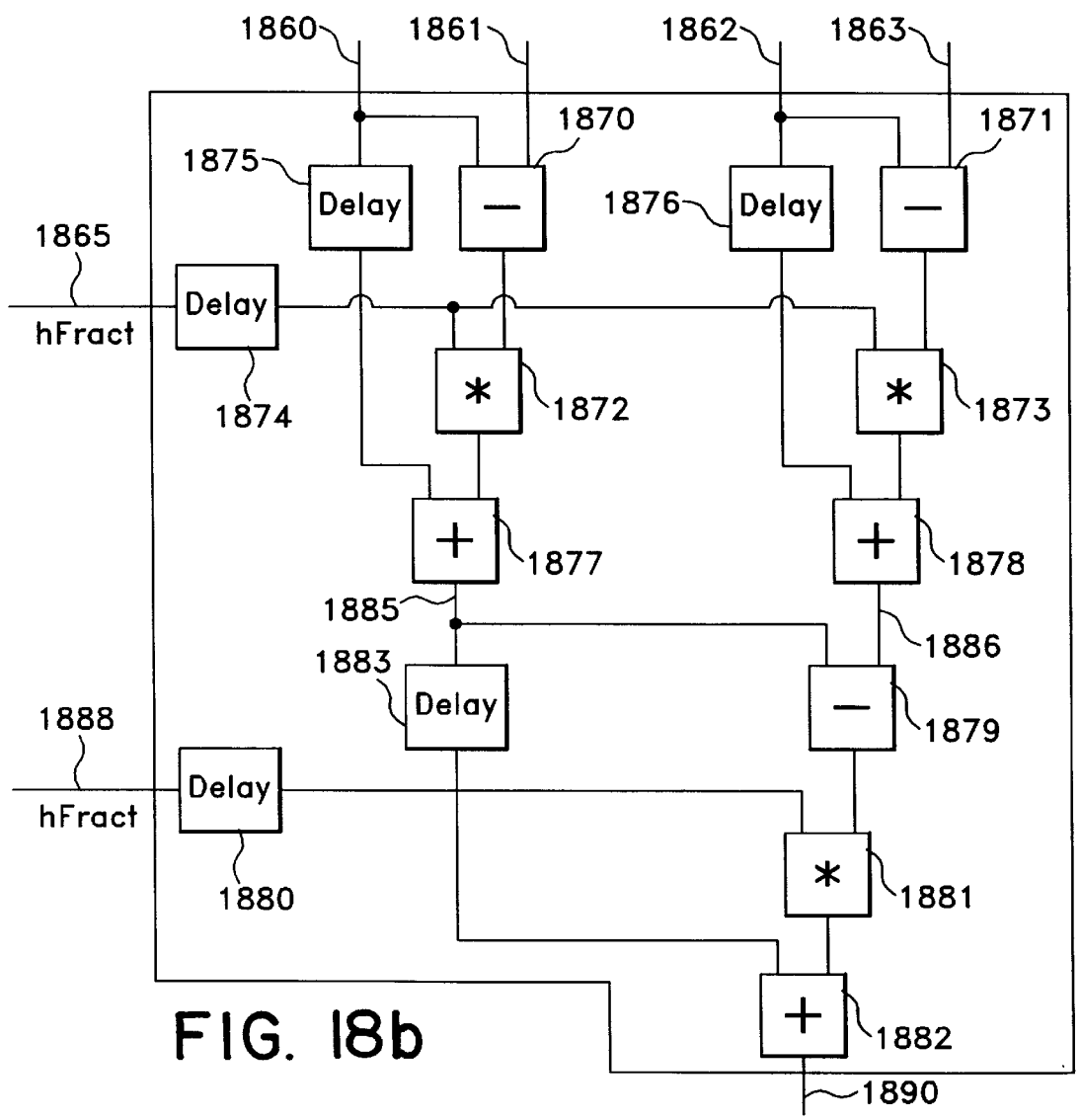
FIG. 18b gives an implementation of two-way linear interpolation.

For a hardware implementation of this, refer to FIG. 18*b*. The four known values r11 1860, r12 1861, r21 1862 and r22 1863 are given as input, together with the position of the wanted value defined by vFract 1866 and hFract 1865. The upper intermediate value 1885, 1830 (cp. FIG. 18*a*) is computed by the expression (r12−r11)*hFract+r11, implemented by a subtractor 1870, multiplier 1872, a delay module 1875 to compensate for the latency in the subtractor 1870 and the multiplier 1872, and and adder 1877. The lower intermediate value 1886, 1832 (cp. FIG. 18*a*) is computed similarily by the expression (r22−rr21)*hFract+r21, implemented by a subtractor 1871, multiplier 1873, delay module 1876 and adder 1878. The final value 1890 is then again computed similarily by the subtractor 1879, multiplier 1881, delay module 1883 and adder 1882, operating on vFract 1865 delayed in a delay module 1880 to account for the latency in computing the upper and lower intermediate values.

Figure 20A:
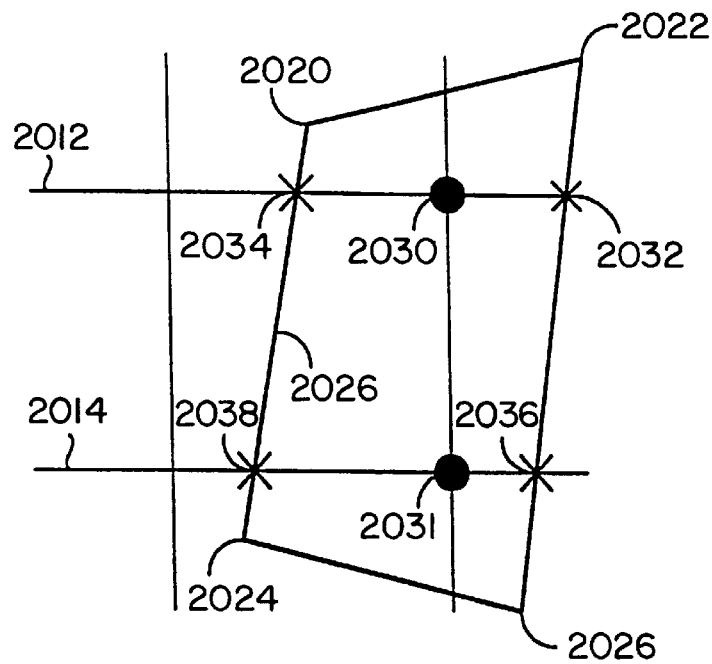
FIGS. 20a and b illustrate the principle of a move module based on quadrangles.
Figure 20B:
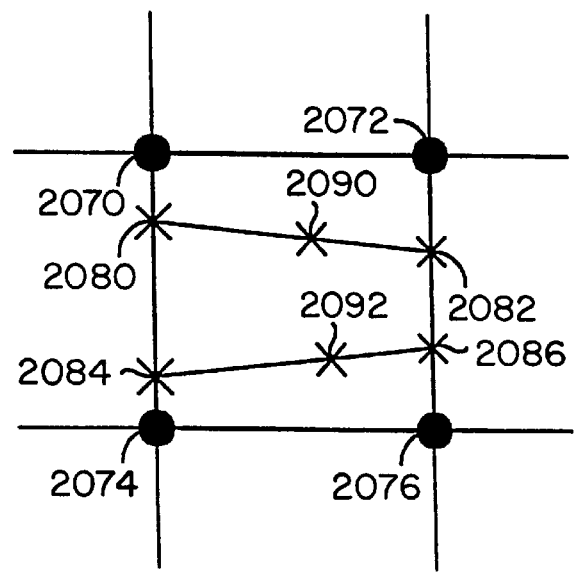

In the previous, triangles were used for coordinate mapping and interpolation. In another preferred embodiment, quadrangles, directly based on all four RefEls, are used. Refer to FIG. 20*a*. The quadrangle 2026 is formed by the four RefEls 2020, 2022, 2024, 2026 moved according to their motion vectors. For each of the scan lines 2012, 2014 through this quadrangle, intersection points 2032, 2034, 2036, 2038 are found between the scan line and the quadrangle. These can either be used for progressively interpolating values for all domains at intersections between quadrangle and scan lines and then interpolating between these again for all pixels 2030, 2031 within the quadrangle on each scan line, similar to what was shown in FIG. 14, or they can be used to compute vFract, hfract values to be used for two-way linear interpolation, similar to what was shown in FIG. 19. The latter is illustrated in FIG. 20*b*. The scan lines 2012, 2014 through the quadrangle 2026 of FIG. 20*a* have been mapped back to the reference position by computing for each scan line the left quadrangle intersection point 2080, 2084 expressed as a vFract value and the right quadrangle intersection point 2082, 2084 also expressed as a vFract value, and based on the left and right intersection point the vFract and hFract value for the final pixel position 2090, 2092 can be computed. This is then used as basis for the two way linear interpolation.

A pseudo-code algorithm for this method is given as appendix A.

In one preferred embodiment, the move module 492 has a built in anti-aliasing filter to avoid problems with aliasing from the re-sampling of images with high-frequency contents.

In another preferred embodiment, the encoder provides pre-filtered blush factors. In case magnification or minification of the holon occur during a sequence, then the encoder provides blush factors pre-filtered for the lowest resolution and another blush factor corresponding to the difference between the necessary filtered blush result and the already transmitted blush, so that this new blush factor can be used to simulate the filtering.

Figure 21A:
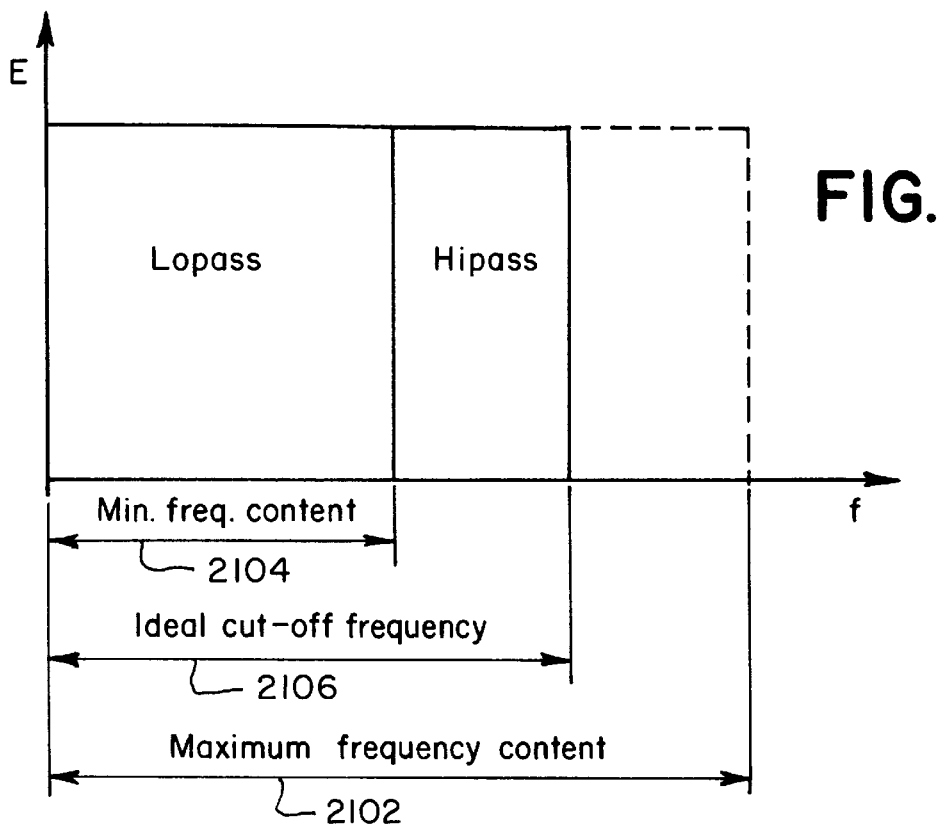
FIG. 21a illustrates an ideal strategy for handling anti-aliasing.

FIG. 21*a* illustrates an ideal low pass filtering operation. An image in a reference position is to be reproduced at several different resolutions, producing frames. Given an image feature with some vertical length in a region of an image, a vertical magnification factor for this region of the image is defined as the ratio between the corresponding length of the same feature in the moved image and the original vertical length. A similar definition apply for the horizontal magnification. The reproduction at several different resolutions then correspond to different values of the magnification factors. When the reference image is magnified so that the resulting resolution is more than twice the inherent resolution in the reference image, then the reproduced image should have all available details from the reference image, corresponding to maximum frequency content. For smaller values of the magnification factors, the reference image must be correspondingly filtered to below Nyquist frequency. Thus there is usually a maximum frequency content 2102 and a minumum frequency content 2104 for the reference image, and for intermediate magnification factors there is an ideal cut-off frequency 2106 inbetween.

Figure 21B:
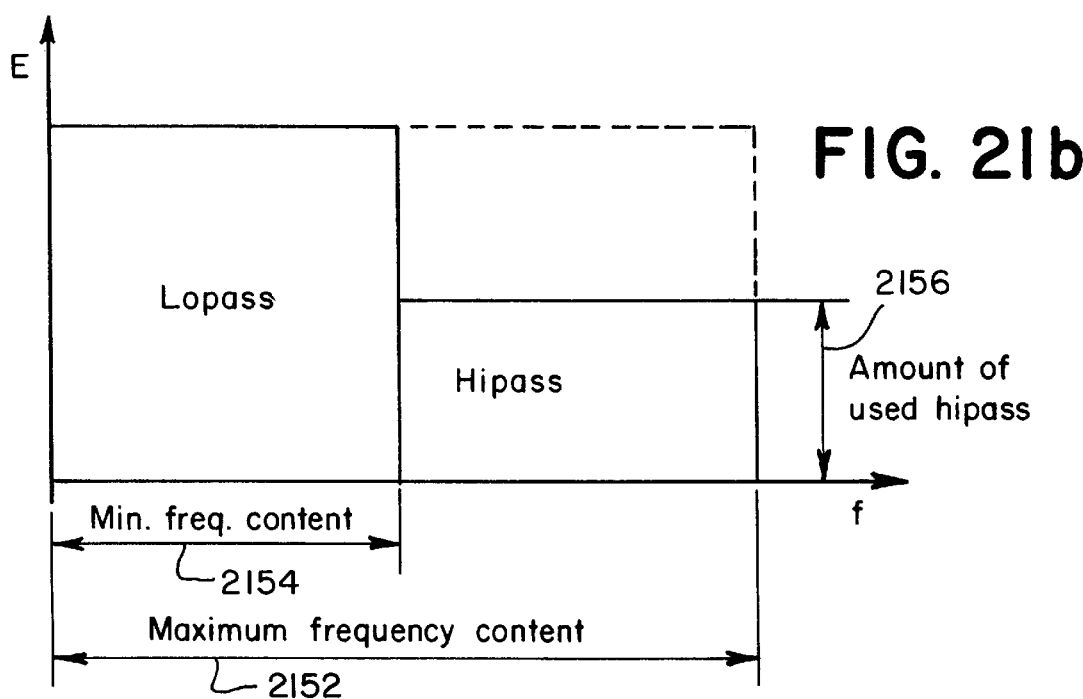
FIG. 21b illustrates an approximation to the ideal strategy.

From compression ratio considerations, it is usually preferred not having to retransmit many versions of the reference image. This would normally mean that the anti-aliasing filtering would have to be done in the decoder. However, there is an approximation as indicated in FIG. 21*b*. Instead of having a variable ideal cut-off frequency between the minimum 2154 and maximum 2152 frequency contents, the image can be split in one low pass and one high pass part, and the amount of used high pass 2156 can be varied according to the magnification factor.

Figure 22:
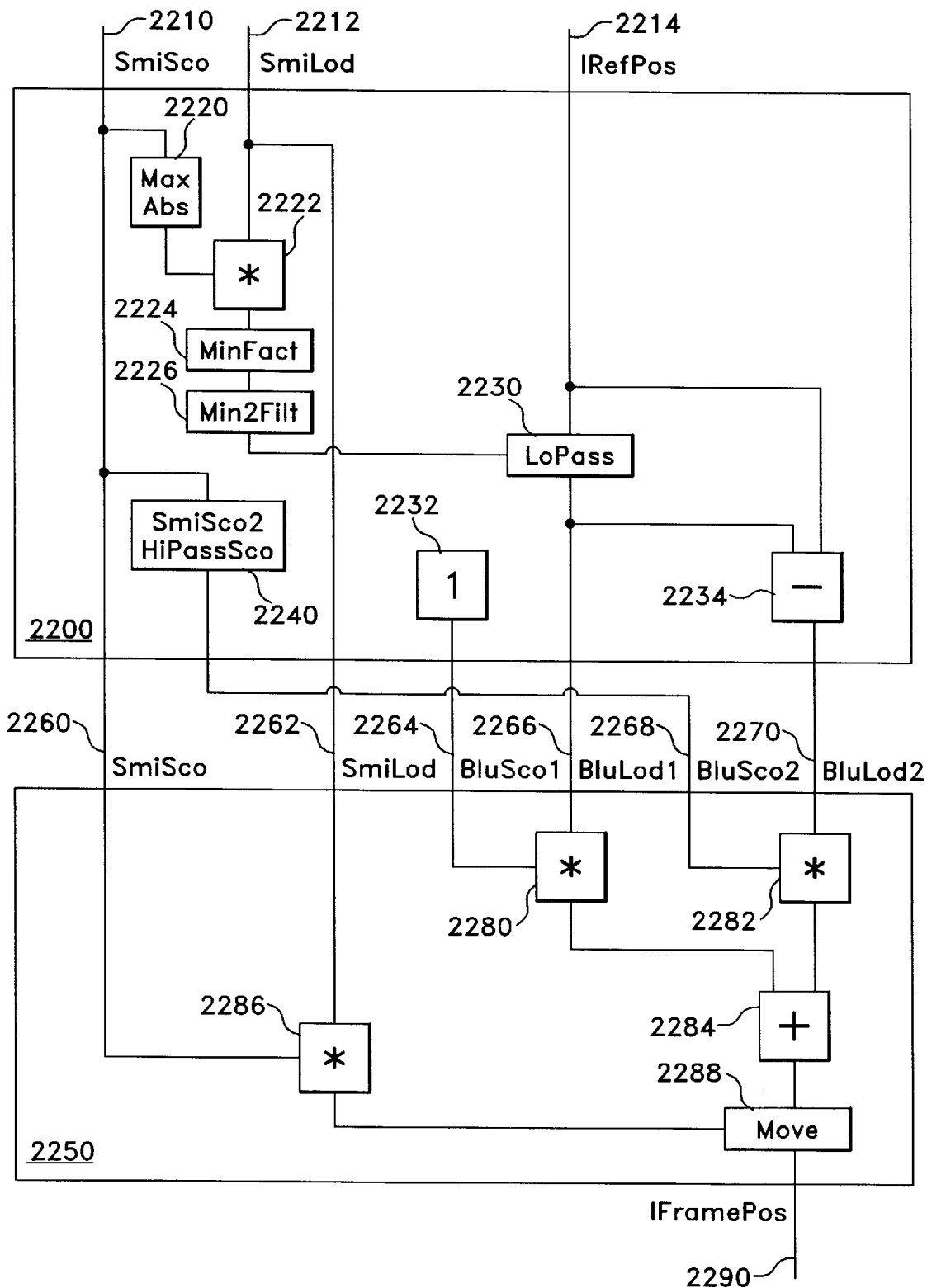
FIG. 22 gives a data flow diagram for the antialiasing approximation.

A data flow diagram of this is shown in FIG. 22. An anti-aliasing preprocessor 2200 is given as input smile scores 2210, smile loads 2212 and an image in reference position 2214. Only one-factor smile and blush is used for this example, but similar principles apply for input with multi-factor smile and for input with nod.

Smile scores of zero corresponds to no motion, while large positive or negative smile scores correspond to much motion relative to reference position. The latter will normally be dominating with regard to aliasing problems. Therefore a module for finding the maximum absolute value 2220 searches among the smile scores, and this score is used for forming the assumed worst case smile field from the smile load in a multiply unit 2222. This smile field is fed to a module for finding magnification factors 2224, both in vertical and horizontal direction, for each region in the image. These regions can be non-overlapping or overlapping blocks of pixels. The magnification factors are fed to a module 2226 which transforms magnification factors into filter coefficients for a low-pass filter 2230 operating on the reference position image. The transformation should be so that smaller magnifications result in low pass filters with lower cut of frequency. The resulting low pass image is output as the blush load 2266 of a first blush factor to a decoder 2250. The corresponding scores 2264 are locked at ones by a suitable module 2232. The difference between the low pass image and the original reference position image is formed in a subtractor module 2234 and output as a second blush load 2270 to the decoder. The required amount of high pass content is computed in a module 2240. This computation should be so that scores close to the worst case should result in values close to zero, and small scores should result in values close to one. The result is fed to the decoder as a blush score 2268 for the second blush factor. The original smile scores 2210 and smile load 2212 are fed unchanged 2260, 2262 to the decoder.

The decoder is similar to all decoders discussed earlier, in that it multiplies in multiply modules 2280, 2282 the blush scores with the blush loads, aggregates in an adder 2284 the results, and moves in a move module 2288 this image according to the product, computed in a multiply module 2286, of smile score and smile load, thus producing its final image in frame position 2290.

The transfer of pixels between the move module 492 and the frame or field buffers 497, 498 can be a bottleneck. E.g. for PAL sampled at 720*576 with 25 frames per second, this corresponds to more than 10 000 000 pixels per second. Because of time lost when switching between frames and runs, because the move module because is not always able to produce one pixel output per clock pulse, and because a value may be transferred to one location in the frame or field buffer more than once because of overlapping holons, this means that the peak speed from the move module must be about 30 000 000 pixels per second. Since for each pixel the Z field value must be read and may also be set, which for the case of a system with Prob the same is true also for R, G and B, this means that about 60 000 000 memory accesses for each of R, G, B and Z must be performed per second, corresponding to about 16 ns per access if one value must be transferred at a time for each of R, G, B and Z. At this speed, either high cost memory modules must be used for the entire frame or field buffers, or a cache 494 can be introduced between the move module 492 and the frame or field buffer 497, 498.

The pixels output from the move module 492 are generated according to the order defined by the S field for systems with run length coded S field and in scan line order from reference position for other systems. This means that the output satisfies one important condition for a cache to be efficient, namely spatial locality: If one pixel ended up at some position in the frame or field buffer, it is probable that the next pixels output will end up in nearby positions.

Details on how to design a cache can be found in "Computer Architecture, a Quantitative Approach", J. Hennessy & D. Patterson, Morgan Kaufmann Publishers, 1990, which is hereby included by reference.

The normal way to establish loads in the load stores 414 . . . 416 is to transmit a compressed version and decompress accordingly in the still image decoder 410. Another way is to create loads using the IDLE modelling method. This can be implemented by having a feedback transmission line 415, which by suitable switches 495, 412 can direct output from the decoder back into the load stores 414 . . . 416. This is called meta-decoding.

One application for metadecoding is when a decoder is used often or exclusively for a known type of sequences. One example could be a videophone decoder, where human faces are likely to appear. In such cases, standard loads can have been established and stored on the decoder side. These standard loads can represent motion or intensity patterns that are likely to appear, for example mouth motions corresponding to speech, represented as smile loads. The standard loads 403 must first be read into the decoder and must then be adapted so that they fit to the reference position coordinate system of the input images. This adaption can be used by loading the standard smile loads from an external storage media at the decoder side into the load stores, and nod matrices, prepared by the encoder, necessary for moving the standard loads into the reference position actually occupied with the face, into the nod store, then metadecoding using each of the standard smile loads as blush for one color channel, and feeding the result back into the load stores, where it can later be used as real smile factors for the face.

Other examples of how to use the metamodelling feature can be found in WO95/08240, already mentioned above.

The output from the mover comes out in a complex address order. When the final image is transferred to the final output medium, it must in most cases appear in scan order. This means that there must be a buffer between the output from Move and the output device.

To exploit time efficiently, a double buffer can be used. In this case, one buffer is written be the decoder while another is read by the video circuitry. Each time one buffer has been filled and the other is no longer needed for viewing, the roles of the two buffers are switched.

One preferred embodiment is to let the contents of the buffer to be filled with a decoded image be reset to empty each time the buffers are switched, Another preferred embodiment is not to reset the image to empty, while normally the new image shall eventually cover all the old case. And if it does not, keeping the corresponding part of the previous frame is usually a good error concealment technique.

In any of the two cases above, the Z buffer has to be reset to far away between each frame.

The above double buffering can be combined with interlacing. For odd fields the loop v module 1464 (FIG. 14), 1954 (FIG. 19) loops only over odd values and for even fields the loop v module 1464, 1954 loops only over even values.

The frame or field buffer 497, 498 is normally reset to empty between each frame or field, possibly on command from the encoder. However, there are cases where the reset is not wanted. One such reason is that serious transmission errors have been detected, and instead of generating new frames or field with gross errors, the current field or frame is kept instead. A similar reason comes when the model has not been fully updated in the decoder after a scene shift. Yet another reason is that the decoder may be busy doing meta-decoding. The decision of skipping the reset may come from either the encoder or the decoder.

After the frame has been decoded according to the IDLE principle as explained above, there may be reconstruction errors, caused by the IDLE model not being able to reconstruct the frame fully. The residual may then for each frame be transmitted and added before the final result is viewed. By using traditional image compression techniques, the compression gain for the residual will be high, because most of the structure of the original will already have been expressed by the IDLE model.

Figure 23:
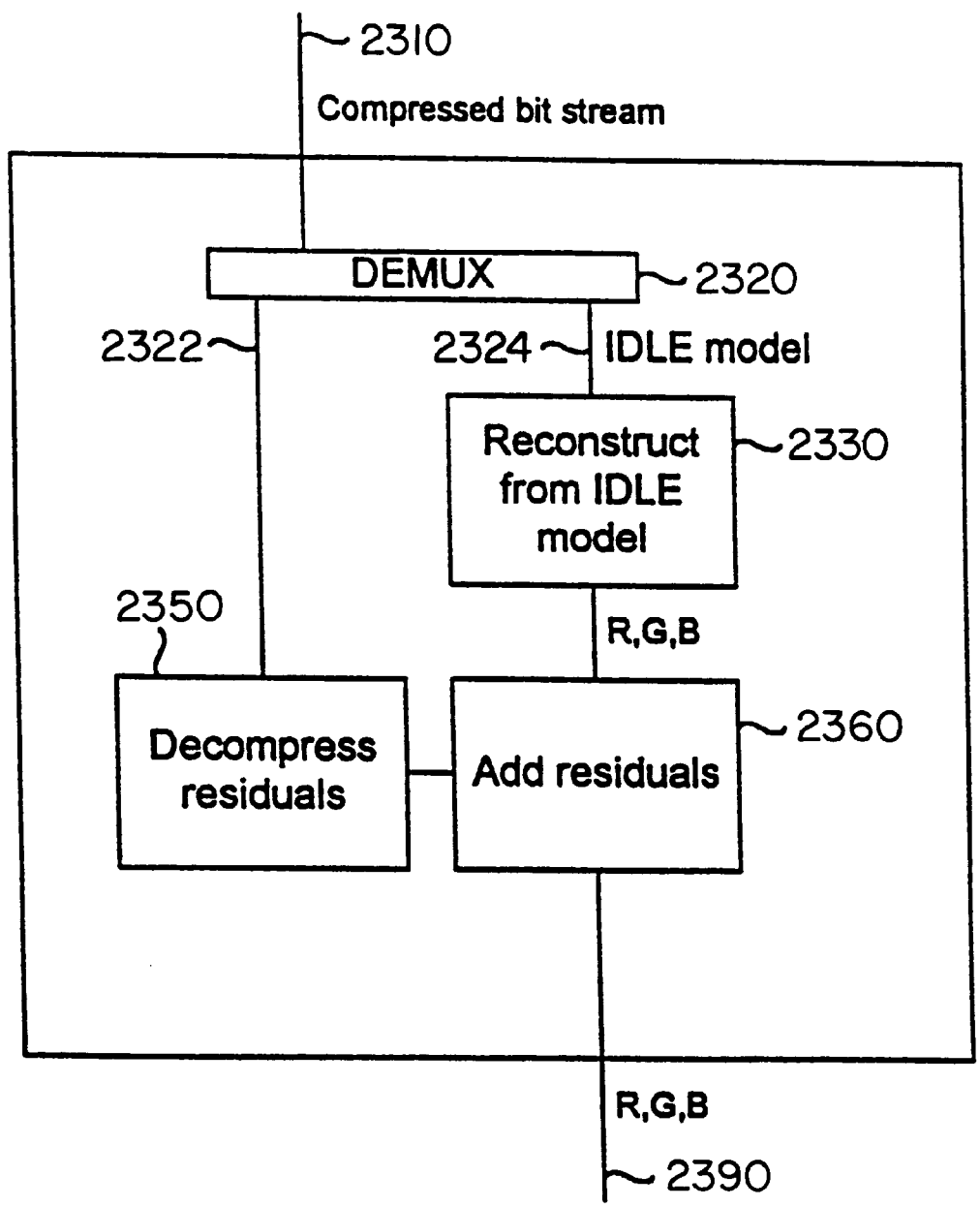
FIG. 23 illustrate final filtering residual correction for the frames.

This is illustrated in FIG. 23. An incoming compressed bit stream 2310 contains both the compressed IDLE model 2324 and framewise residuals 2322. A demux 2320 splits the two, such that the IDLE model 2330 is decompressed into r, g and b values for frame according to the decoding method disclosed above, and the residual is decompressed into r, g and b values in a decoder 2350 using traditional image compression/decompression techniques. The two are added in an adder 2360 and the output 2390 is the final result, ready for viewing or other use.

In the preceeding, the bit compressed bit stream has been explained in terms of how it is decoded in the various modules. To give an alternate view, here is a short sample of the structure of the compressed bit stream, shown in symbolic, simplified form:
(1) Time code 1-2345-06-Odd
(2) initialize to empty model
(3) Add one holon with format equal to entire frame
(4) Add one blush factor, R, G and B, for first holon [Compressed loads, R, G, B]
(5) Set scores [Compressed scores]
(6) Decode
(7) Time code 1-23-45-06-Even
(8) Decode
(9) Time code 1-23-45-07-Odd
(10) Add one holon [Compressed S field]
(11) Set nod for second holon [Compressed nod matrix]
(12) Add one blush factor, R, for first holon [Compressed loads, R]
(13) Add one blush factor, R, G and B, for second holon [Compressed loads, R, G, B]
(14) Add one smile factor, V, for first holon [Compressed V load]
(15) Decode Comments, with reference to the line numbers, follow:
(1) The following data specifies the odd field of the frame 1 hour, 23 minutes and 45 seconds from the beginning of the sequence. Such time codes are used for fast search and also for several other purposes.
(2) The model, including all load stores, S field store and score store, is set to empty
(3) When holons are added, their S field should be given. In this case, the S field of the holon coincides with the frame size, and this has been given a special code. The corresponding S field is set up in the S field store.
(4) A first blush factor is defined. The control processor allocates three load stores, one for each color channel. The load is decompressed and loaded into the allocated load stores. The address is synchronized with the S field store. The control processor sets the router setup store so that the output from the three load stores will be routed into the sum blush module.
(5) Scores, in this case only for blush of holon 1, are decompressed and loaded into the score store.
(6) The odd field is decoded, using the current content of load scores, score store, S field store, and router setup store.
(7) The following data specifies the corresponding even field.
(8) The even field is decoded.
(9) The following data specifies the odd field of the next frame
(10) A holon is added. In this case, an explicit S field is given. This is decoded and stored in the S field store.
(11) The first had no explicit nod, i.e. it had only the unity matrix by default. The second holon has an explicit nod matrix, which is decompressed and stored in the nod store.
(12) A second blush factor for the red component of holon 1 is added. One load store is allocated, the load is deompressed and loaded, the routine updated.
(13) Blush for the second holon is given and handled by normal procedure.
(14) A vertical smile factor is introduced; the load is handled by normal procedure.
(15) The field is decoded.

The data stream can be seen to have one small command part, indicating what type of actions should be initiated, and a larger data part, containing compressed representations of loads etc. For storage based applications of this invention, it can be advantageous to split the two, but with cross references, such that the small command part can be quickly scanned and analyzed, e.g. for search modes, while the data part is read on demand.

For a video playback system operating from a storage medium, e.g. a video tape or a compact disk, and also for a video on demand system accepting a compressed bit stream from a distribution central, variable speed of playback is highly wanted. The term variable speed of playback includes normal playback, reverse play, fast forward, fast backward, slow forward, slow backward and still image.

Slow forward can be implemented by repetition for normal frames. E.g, for half speed, every frame could be displayed twice.

Figure 25:
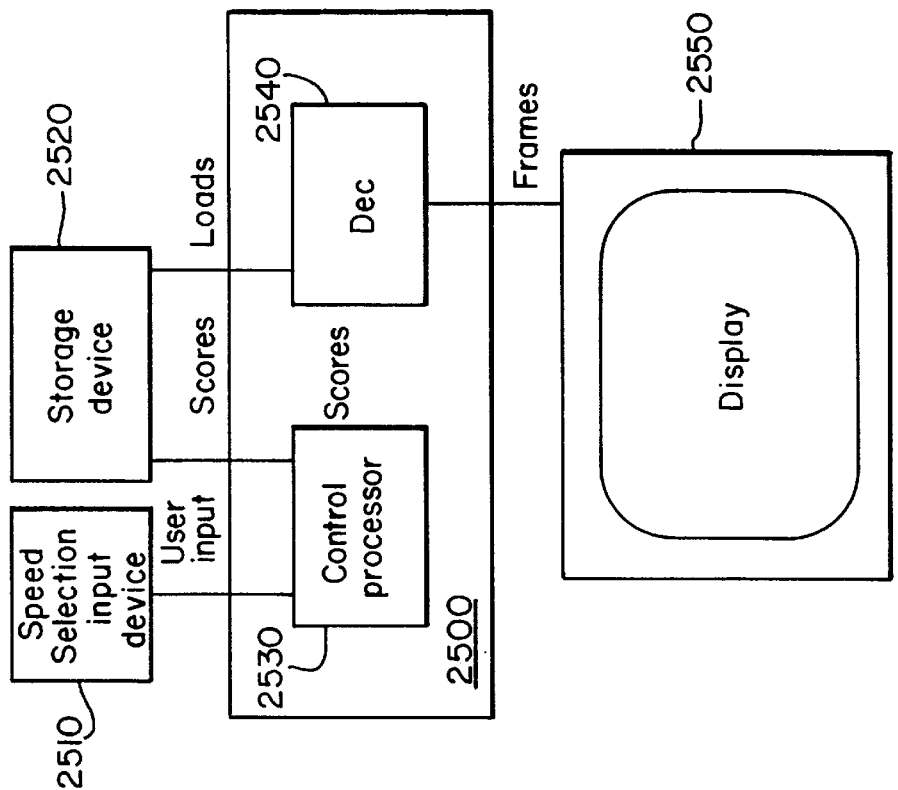
FIG. 25 shows a system for altering speed of playback during decoding.

Another method is to implement slow forward by interpolation of scores. Refer to FIG. 25, where a video replay device 2500 is shown. The user selects speed of replay in a speed selection input device 2510. This could be one of the functions of a remote control. A storage device 2520 contains the compressed bit stream. This stream is read as two parts; namely the scores which are read into the control processor 2530 and the loads which are read into a decoder 2540. For normal playback, the scores are placed directly into a score store being part of the decoder 2540. For slow forward playback, the scores are interpolated before being placed into the score store. E.g, for half speed, every second set of scores fed to the decoder 2540 could be the scores as read from the storage device 2520, while the remaining could be values interpolated in the control processor 2530. The use of interpolation of scores for implementation of slow forward has the advantage of producing smooth, stepless motion. One disadvantage is that in cases where the modelled representation does not correspond well to the physical reality, then unexpected results may occur. E.g, when a motion has not been recognized as such in the encoder but is instead modelled using blush factors, then the slow replay will consist of objects fading in and out instead of moving.

Backward play may also be achieved. The main difference from normal forward play is that instead of just following the list of instructions in the compressed bit streams, reading loads and S fields in the order given, during backward play the decoder must analyze the compressed bit stream, in particular the command part, to determine which holons and which factors are active at any time so that the correct loads and S fields can be loaded.

The principles of slow forward play and backward play can be combined to achieve slow backward play.

For fast forward, the problem is usually not to find a good set of scores. Rather, the computational bottleneck will usually be the reading of the compressed bit stream and corresponding still image decoding and updating of load stores. To compensate for this, the loads can be assigned priorities, such that when there is not time to input all loads, then only the most important are read. One special case of this is when only one blush load is allowed for each scene shift. In this case, fast forward through a sequence will produce one still image for each scene, which may be considered to be visually more pleasant than the normal fast motion of video recorders and the like.

The principles of fast forward play and backward play can be combined to achieve fast backward play.

Still images can be made in several ways, e.g. by just stopping the input from the compressed bit stream.

Figure 24:
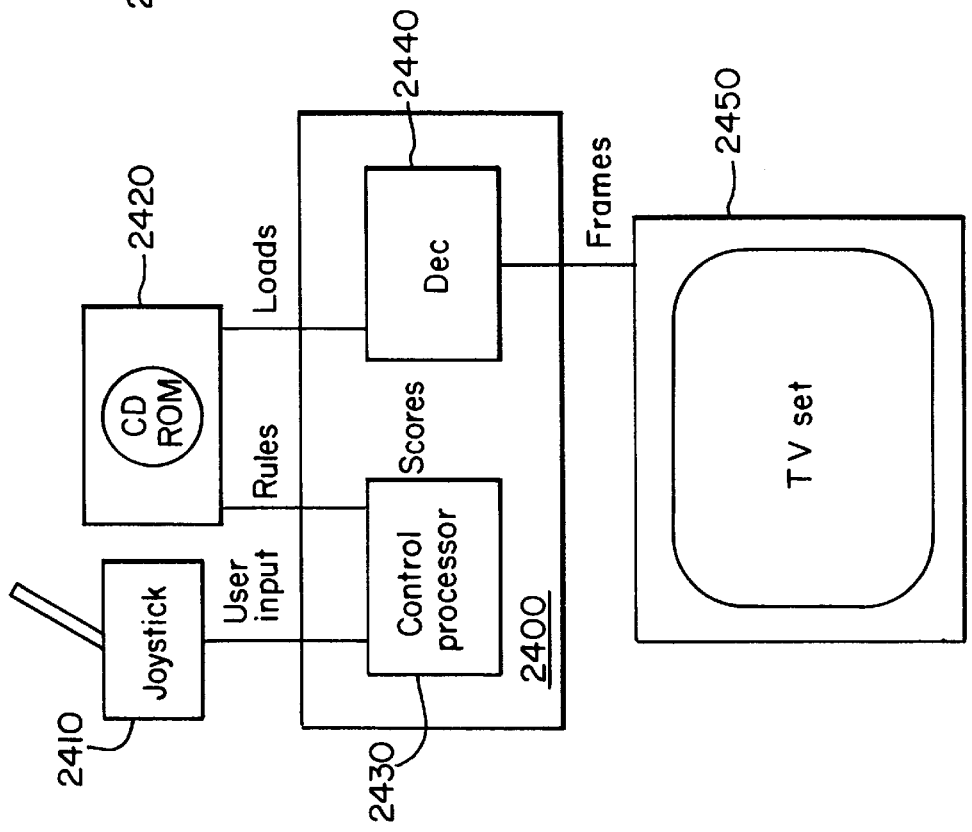
FIG. 24 shows a system for altering images during decoding, to be used e.g. for games.

The decoder may also be used for simulations, games or other applications which require images to be changed according to user input. Refer to FIG. 24, which presents a games controller 2400. A module 2410 for accepting user input is exemplified with a joystick, but could also be other input devices, like keypads, full keyboards, game paddles or similar. The game itself is stored on a storage medium, here exemplified by a CD-ROM 2420. The game consists partly of rules for how the user input should be interpreted and how this should affect the image, and of loads defining the actual images and the possible changes to these image. A control processor 2430 performs this interpretation, thereby producing scores. The loads and scores are fed to a decoder 2440, which produces the frames that can then be viewed on some kind of display or monitor, e.g. on a TV set 2450.

For simulations or games design, much of the work will be in producing rules to control motion. Much of this work again will be in controlling nod. To simplify this work, the nod mechanism can be made to represent motion in a way which allows an easier physical interpretation. For example, while rotating an object around an axis, apart from some degenerate cases, requires altering most of the coefficients of the nod matrix for the corresponding holon for each frame, it would have been better if the axis could have been specified once, and then only the angle of rotation could have been specified for each frame.

One way of doing this is to allow nod matrices to be parameterized and concatenated. This is described in "Principles of Interactive Computer Graphics", already described above. The parameterization would then correspond to letting one parameter control the degree of translation, scaling, shear or rotation, and the concatenation would correspond to both allowing such translation, scaling, shear and rotation to appear around any axis or point, and to allow the combination of several such effects.

A further extension of this is to allow coordinated behaviour for several holons. Assume that a human body modelled as separate holons for torso, legs, arms and head should be made to walk. Then it would be advantageous to let one parameter control the speed or position of the whole body, while other parameters could control the relative motions of the parts of the body.

The above can be achieved by allowing a tree structure for the concatenation of nod matrices. This can be modelled using four tables. The first table lists and numbers which inputs are available. Typical inputs could be the state of a joystick or a keyboard, a value indicating time from some clock or counter, or a state indicator produced by other game actions. The second table lists and numbers which parameterized nod matrices should be used and indicates how the parameter should be applied. The third table gives triples of nod matrix numbers, specifying matrix multiplications. The third number of each triple defines where the result of the matrix multiplication should be placed, while the first two numbers refer to which matrices should be multiplied together, and each can be either a number referring to the second table or the number of a previous matrix multiplication as defined in the third table itself. The fourth table gives for each holon the number of the nod matrix to be used by giving a number from one of the third numbers in the triplets defined in table three. The four tables together can be regarded as specifying a program to produce nod matrices. This program can then be executed by a decoder using updated inputs prior to decoding each frame. The above calculations typically involve sufficiently little computational load to be easily executable on a control processor implemented as a general purpose microprocessor, e.g. Intel 386 SX.

Smile and blush scores can also be defined as dependent on the inputs in the above framework.

While the invention has been particularity shown and described with reference to the preferred embodiments thereof, it will be understood by those skilled in the art that various changes in form and detail may be made therein without departing from the spirit and scope of the invention.

Appendix A

Method for moving an image according to a motion field.
Method:
Progressive interpolation using scan lines intersecting triangles
Input:
Reference position image, consisting of nv*nh RefEls, each containing:
r, g, b: Red, green and blue intensity
v, h: New position
z: Depth value
Prob: Opacity
Output:
FrameBuffer with pixels, each containing:
r, g, b: Interpolated red, green and blue intensity
Algorithm:
For each group of four pixels that are adjacent in the referance image:
For each of the two three pixel groups:
Sort the pixels accoring to the moved v coordinate in ascending order. Denote the sorted pixels with suffixes Up, Middle and Low respectively.
Find out whether the second point is to the left or to the right of the vertex between the first and third point:
Based on the v and h coordinates of the first and third pixel, and given the v coordinate of the second pixel, calculate the h coordinate of the crossing between the vertex between the first and third pixel and a horizontal line through the second pixel:

hCross=hUp+(vMiddle−vUp)/(vLow−vMiddle)*(hLow−hUp)

SecondLeft=(hCross<hMiddle)

Prepare for looping through scan lines in the frame position:

vUp=ceil(vUp)

vLow=floor(vLow)

For each vCurrent from vUp to vLow: (i.e. for each scan line:)
Interpolate h, r, g, b and Prob of the vertex between first and third pixel at vCurrent, denote the results with suffix LeftScan
Make sure that the correct vertex is used when calculating the limits of the current scan line:

```
if vCurr <=vMiddle
    EndPixel = first pixel
else
    End Pixel = third pixel
```

Interpolate h, r, g, b and Prob of the vertex between the second pixel and EndPixel, denote the results with suffix RightScan

```
If SecondLeft:
    Swap LeftScan and RightScan
```

For each hCurrent from ceil(hLeftScan) to floor (hRightScan):
Interpolate r, g, b, z and Prob at hCurrent based on h, r, g, b, z and Prob at RightScan and LeftScan, denote the results with suffix Current
Read r, g, b and z at vCurrent, hCurrent, denote the results with suffix Old.

```
if zCurrent > zOld:
    rNew = rOld + (rCurrent-rOld) * ProbCurrent
    gNew = gOld + (gCurrent-gOld) * ProbCurrent
    bNew = bOld + (bCurrent-bOld) * ProbCurrent
```

Place rNew,gNew and bNew back into image at vCurrent, hCurrent

Appendix B

Method for moving an image according to a motion field.
Method:
Backmapping quadrangles with two-way linear interpolation
Input:
Reference position image, consisting of nv*nh RefEls, each containing:
r, g, b: Red, green and blue intensity
v, h: New position
z: Depth value
Prob: Opacity Output:
FrameBuffer with pixels, each containing:
r, g, b: Interpolated red, green and blue intensity
Used subroutines:
NextClockwise:
Find next RefEl of quadrangle in clockwise order (2070, 2072, 2076, 2074, 2070)
NextAntiClockwise:
Find next RefEl of quadrange in anti-clockwise order (2070, 2074, 2076, 2072, 2070)
Algorithm:
Initialize ZBuffer to zeros
For each domain d in [r, g, b]:
Initialize FrameBuffer.d to zeros
For each quadrangle of four adjacent RefEls in the reference position image:
Augment upper left RefEl with vFract=0, hFract=0
Augment upper right RefEl with vFract=0, hFract=1
Augment lower left RefEl with vFract=1, hFract=0
Augment lower right RefEl with vFract=1, hFract=1

Find Upper as the RefEl with smallest v coordinate
Find Lower as the RefEl with largest v coordinate Initialize edges as candidates for intersection with scan line
UpperClockwise=Upper
LowerClockWise=NextClockWise(UpperClockwise)
UpperAntiClockwise=Upper
LowerAntiClockwise=Lower Scan through all scan lines that go through the quadrangle:
For vScan=ceil(Upper.v) to floor(Lower.v):

Make sure the correct edges are used for intersection interpolation:
While LowerClockwise.v<vScan
UpperClockwise=LowerClockwise
LowerClockwise=NextClockwise(LowerClockwise)

While LowerAntiClockwise.v<vScan
UpperAntiClockwise=LowerAntiClockwise
LowerAntiClockwise=NextAntiClockwise(LowerAntiClockwise)

Interpolate h, vFract and hFract along two edges, one set of values for the AntiClockwise edge and one for the Clockwise edge;
For each domain d in [h, vFract, hFract]:
AntiClockwise.d=UpperAntiClockwise.d+ (LowerAntiClockwise.d−UpperAntiClockwise.d) * (vScan−UpperAntiClockwise.v)/ (LowerAntiClockwise.v−UpperAntiClockwise.v)
ClockWise.d=UpperClockwise.d+ (LowerClockwise.d−UpperClockwise.d) * (vScan−UpperClockwise.v)/(LowerClockwise.v−UpperClockwise.v)
Ensure that the pixels are scanned from left to right;

```
if(AntiClockwise.h <= ClockWise.h)
    Left = AntiClockwise
    Right = ClockWise
```

-continued

```
else
   Left = ClockWise
   Right = AntiClockwise
```

Traverse the whole-pixel positions of the scan line:
for hScan=ceil(Left.h) to floor(Right.h):
Interpolate reference position coordinates vFract,hFract between edge values:
  vFract=Left.vFract+(hScan-Left.h) * (Right.vFract-Left.vFract)/(Right.h-Left.h)
  hFract=Left.hFract+(hScan-Left.h) * (Right.hFract-Left.hFract)/(Right.h-Left.h)
Perform bi-linear interpolation between the four RefEls in current quadrangle, using vFract, hFract as weights:
  For each domain d in [r, g, b, Prob, Z]:
  Up=UpLeft.d+(UpRight-UpLeft) * hFract
  Lo=LoLeft.d+(LoRight-LoLeft) * hFract
  New.d=Up+(Up-Lo) * vFract
  Place the value:

```
If New.Z > Z[vScan,hSan]:
   For each domain d in [r, g, b]:
      FrameBuffer.d[vScan, hScan] = FrameBuffer.d[vScan, hScan]+
         New.Probe * (New.d - d[vScan, hScan])
   ZBuffer[vScan, hScan] = New.Z
```

We claim:

1. An apparatus for decoding a video sequence, compressed according to a data model suitable for transmission, storage or analysis, into decompressed frames suitable for viewing, said data model comprising a plurality of spatial intensity change patterns, called intensity loads, a plurality of spatial pixel address change patterns, called address loads, and a plurality of values, called scores, specifying for each frame how much of each load should be present, the apparatus comprising:
(a) means for receiving (320; 406, 408) and storing (326; 414, 416) the plurality of intensity loads and the plurality of address loads,
(b) means for receiving and storing (328; 442) the plurality of scores,
(c) means for aggregating (340, 354; 446, 476) the contributions from each intensity load and corresponding scores into an intermediate image,
(d) means for aggregating (340, 352; 446, 474) the contributions from each address load and corresponding scores into a motion field,
(e) means for displacing (360; 492) the contents of the intermediate image according to the motion field, producing a final frame (370; 497, 498),
wherein means (a) to (e) are connected in such a way that a pipeline consisting of parallel synchronous data paths is formed, through which pipeline the intermediate image and motion field are continuously transmitted.

2. The apparatus according to claim 1, wherein the apparatus comprises:
a means (322; 420) for grouping together parts of each intensity load and corresponding parts of each address load into groups, called holons,
wherein the means for receiving and storing (328; 442) the plurality of scores has one set of scores for each holon, and
the means for aggregating (c) and (d) each uses the scores of each holon when aggregating the contributions.

3. The apparatus according to claim 1, wherein the apparatus comprises a means for exchanging (463) the data paths within the pipeline.

4. The apparatus according to claim 2, wherein the apparatus comprises a means for exchanging (463) the data paths within the pipeline dependent on which holon is being transmitted.

5. The apparatus according to claim 1 or 2, wherein the means for storing (326; 414, 416) the intensity and address loads is adapted to represent the loads in a lower spatial resolution, and the apparatus further comprises means for converting (430) from lower to higher spatial resolution.

6. The apparatus according to claim 1 or 2, wherein the means for storing (326; 414, 416) the intensity and address loads is adapted to represent the loads in a compressed state, and the apparatus further comprises means for decompressing the loads.

7. The apparatus according to claim 1, wherein the apparatus comprises a plurality of means for generating (455) a parameterized texture, coupled in the pipeline after the means for storing (414, 416) but before the means for displacing (360; 492).

8. The apparatus according to claim 1 or 2, wherein the apparatus comprises a means for applying (486) an affine transform to the motion field for each frame.

9. The apparatus according to claim 1 or 2, wherein the apparatus comprises a means for transmitting (415) at least part of the output of the means (e) back to the means (a).

10. An apparatus for producing images partly dependent on interactive user input, the apparatus comprising
means (2410) for providing user input,
means (2420) for reading game rules and loads from a storage medium,
means (2430) for interpreting said user input according to said game rules, thereby producing scores,
means (2440) for decoding said scores and loads into frames suitable for being viewed on a monitor (2450),
wherein said means (2440) for decoding is one of the apparata according to claim 1 or 2.

11. An apparatus for playback of encoded video sequences at another speed than that primarily intended, the apparatus comprising:
means (2520) for storing an encoded video sequence,
means (2510) for accepting speed selection from user,
means (2530) for reading scores from the encoded video sequence and interpolating scores at time points selected according to said another speed,
means (2540) for decoding images,
means (2550) for viewing said decoded images,
wherein said means (2540) for decoding images is an apparatus according to one of claim 1 or 2.

12. An apparatus for playback of encoded video sequences at another speed than that primarily intended, the apparatus comprising:
means for storing an encoded video sequence,
means for accepting speed selection from user,
means for selecting parts of an encoded video sequence, the selection being dependent on the accepted speed selection and priorities encoded as part of the encoded video sequence,
means for decoding images,
wherein said means for decoding images is an apparatus according to one of claim 1 or 2.

* * * * *